(12) United States Patent
Okawa (10) Patent No.: US 6,756,335 B2
(45) Date of Patent: Jun. 29, 2004

(54) DIELECTRIC PORCELAIN AND RESONATOR USING THE SAME

(75) Inventor: Yoshihiro Okawa, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 198 days.

(21) Appl. No.: 09/990,864

(22) Filed: Nov. 15, 2001

(65) Prior Publication Data

US 2002/0155942 A1 Oct. 24, 2002

(30) Foreign Application Priority Data

Nov. 20, 2000 (JP) .......................... 2000-353562
May 14, 2001 (JP) .......................... 2001-143564

(51) Int. Cl.$^7$ .................. C04B 35/49; C04B 35/457; C04B 35/462; C04B 35/47; C04B 35/465; H01P 7/10
(52) U.S. Cl. ................ 501/136; 501/134; 361/321.5; 333/219.1
(58) Field of Search ................ 501/134, 136; 333/219.1; 361/321.5

(56) References Cited

U.S. PATENT DOCUMENTS

| | | | |
|---|---|---|---|
| 5,356,844 A | | 10/1994 | Hirahara et al. ............ 501/136 |
| 6,143,680 A | * | 11/2000 | Okawa ........................ 501/136 |
| 6,503,861 B1 | * | 1/2003 | Murakawa et al. .......... 501/137 |

FOREIGN PATENT DOCUMENTS

| | | |
|---|---|---|
| JP | 02-192460 | 7/1990 |
| JP | 04-118807 | 4/1992 |
| JP | 06-076633 | 3/1994 |
| JP | 11-106255 | 4/1999 |
| JP | 11-278927 | 10/1999 |

OTHER PUBLICATIONS

CAPLUS 2002:503572, Okawa, "Dielectric ceramics and dielectric resonators", Jul. 2002.*
CAPLUS 2001:554766, Okawa, "Manufacture of dielectric ceramic compositions having high specific . . . ", Jul. 2001.*
CAPLUS 2003:255356, Okawa, "Manufacture of dielectric ceramics for resonators", Apr. 2003.*
CAPLUS 1999:316928, Okawa et al., "Dielectric ceramic compositions with good high–frequency . . . ", May 1999.*
CAPLUS 2002:513042, Okawa, "Neodymium titanate–and calcium aluminate– based dielectric . . . ", Jul. 2002.*
CAPLUS 2001:885398, Okawa, "Preparation and dielectric properties of rare earth . . . ", Jul. 2001.*

* cited by examiner

Primary Examiner—David Brunsman
(74) Attorney, Agent, or Firm—Hogan & Hartson (57) ABSTRACT

The dielectric porcelain of the present invention comprises a polycrystalline material of which a main component comprises oxides containing at least a rare earth element (Ln), Al, M (M represents Ca and/or Sr) and Ti as metal elements, wherein the thickness of a grain boundary layer is 20 nm or less, thereby achieving a high value of ∈r, high Q factor and small absolute value of the temperature coefficient $\tau_f$ of resonant frequency in a high frequency region. Thus this dielectric porcelain is preferably used in dielectric resonators.

9 Claims, 4 Drawing Sheets

DIELECTRIC PORCELAIN AND RESONATOR USING THE SAME

FIELD OF THE INVENTION

The present invention relates to a dielectric porcelain and a dielectric resonator which show a high relative dielectric constant εr and a high Q factor, that indicates a high selectivity of resonance, in high frequency regions such as microwaves and millimeter waves, for example, to a dielectric porcelain suitable for forming high frequency electronic components such as dielectric resonator, dielectric substrate material for MIC (monolithic IC), dielectric waveguide material and laminated ceramic capacitor, and to a dielectric resonator using the same.

BACKGROUND OF THE INVENTION

Dielectric porcelains have been widely used in dielectric resonators, dielectric substrate for MIC and waveguide that are used in high frequency applications such as microwave and millimeter waves. Three major requirements for the dielectric porcelain are as follows.

(1) The material must have a high relative dielectric constant when used to make a small-sized component, since the electromagnetic wave propagating in a dielectric material has a wavelength reduced to $(1/\epsilon r)^{1/2}$.
(2) The material must have less dielectric loss, namely a high Q factor, at high frequencies.
(3) Resonant frequency of the material must be subject to less variation when the temperature changes, that is, the relative dielectric constant εr must be stable with less temperature dependency.

As a dielectric porcelain that satisfies these requirements, for example, Japanese Unexamined Patent Publication (Kokai) No. 4-118807 discloses a dielectric porcelain based on $CaO-TiO_2-Nb_2O_5-DO$ (D represents an element such as Zn, Mg, Co, Mn, etc.) But this dielectric porcelain has Q factor as low as 1600 to 25000 when converted to values at 1 GHz, and temperature coefficient $\tau_f$ of the resonant frequency as high as 215 to 835 ppm/° C., thus there has been a demand to improve the Q factor and decrease the value of $\tau_f$.

To address the problems described above, the applicant of the present application has previously proposed a dielectric porcelain based on LnAlCaTi (Japanese Unexamined Patent Publication (Kokai) No. 6-76633; Ln represents a rare earth element), a dielectric porcelain based on LnAlSrCaTi (Japanese Unexamined Patent Publication (Kokai) No. 11-278927) and a dielectric porcelain based on LnAlCaSrBaTi (Japanese Unexamined Patent Publication (Kokai) No. 11-106255).

Meanwhile Japanese Unexamined Patent Publication (Kokai) No. 2-192460 discloses a dielectric porcelain consisting of $TiO_2-ZrO_2-SnO_2$ as a main component with CoO and $Nb_2O_5$ added thereto.

However, the dielectric porcelain based on LnAlCaTi (Japanese Unexamined Patent Publication (Kokai) No. 6-76633; Ln represents a rare earth element) has such a problem that the Q factor ranges from 20000 to 58000 in a range of relative dielectric constant εr from 30 to 47, and can become less than 35000, and therefore there has been a demand to improve the Q factor.

The dielectric porcelain based on LnAlSrCaTi (Japanese Unexamined Patent Publication (Kokai) No. 11-278927) has such a problem that the Q factor ranges from 20000 to 75000 in a range of relative dielectric constant εr from 30 to 48, and can become less than 35000, and therefore there has been a demand to improve the Q factor.

The dielectric porcelain based on LnAlCaSrBaTi (Japanese Unexamined Patent Publication (Kokai) No. 11-106255) has such a problem that the Q factor ranges from 30000 to 68000 in a range of relative dielectric constant εr from 31 to 47, and can become less than 35000, and therefore there has been a demand to improve the Q factor.

Although the dielectric porcelain based on $TiO_2-ZrO_2-SnO_2$ allow it to improve the Q factor by adding such additive as CoO or $Nb_2O_5$ as disclosed in Japanese Unexamined Patent Publication (Kokai) No. 2-192460, there has been such problems as the addition of an additive leads to an increase in the material cost, complicated manufacturing process and the necessity to control the firing atmosphere, thus increasing the manufacturing cost.

SUMMARY OF THE INVENTION

A main object of the present invention is to provide a dielectric porcelain that has a Q factor not less than 43000 in a range of relative dielectric constant εr from 30 to 48, particularly a dielectric porcelain which has a high value of Q factor not less than 46000 in a range of relative dielectric constant εr not less than 40 with the relative dielectric constant εr being stable and less dependent on the temperature, and a dielectric resonator using the same.

The dielectric porcelain of the present invention, which achieves the object described above, comprises a polycrystalline material comprising of oxides, as a main component, containing at least a rare earth element (Ln), Al, M (M represents at least one selected from Ca and Sr) and Ti as metal elements, wherein the thickness of a grain boundary layer is 20 nm or less. According to the present invention, it possible to improve the Q factor.

The thickness of the grain boundary layer can be made not larger than 20 nm by manufacturing the dielectric porcelain in a process that uses, for example, an oxide of a rare earth element (Ln) and an Al oxide made in ultra-fine powder by using a nitrate or the like as the starting material.

It is desirable that at least a part of the oxide of Al is included in the form of crystal consisting of at least one kind selected from a group of $\alpha\text{-}Al_2O_3$, $\beta\text{-}Al_2O_3$ and $\theta\text{-}Al_2O_3$.

The dielectric porcelain of the present invention preferably comprises of oxides, as a main component, containing at least a rare earth element (Ln), Al, M (M represents Ca and/or Sr) and Ti as metal elements, and in case that a compositional formula of the oxides is represented by $aLn_2O_x \cdot bAl_2O_3 \cdot cMO \cdot dTiO_2$ ($3 \leq x \leq 4$), molar ratios a, b, c and d satisfy the following relationships:

$0.056 \leq a \leq 0.214$;

$0.056 \leq b \leq 0.214$;

$0.286 \leq c \leq 0.500$;

$0.230 < d < 0.470$;

and $a+b+c+d=1$.

The dielectric porcelain of the present invention preferably contains at least one of metal elements Mn, W, Nb and Ta in the total amount of 0.01 to 3% by weight on the basis of $MnO_2$, $WO_3$, $Nb_2O_5$ and $Ta_2O_5$.

The dielectric resonator of the present invention preferably comprises oxides, as a main component, containing at least a rare earth element (Ln), Al, M (M represents at least one selected from Ca and Sr) and Ti as metal elements, a half width of a peak observed in a range from 700 to 900 cm$^{-1}$ of laser Raman spectrum being 120 cm$^{-1}$ or less. The dielectric resonator may contain at least one of metal elements Mn, W, Nb and Ta in the total amount of 0.01 to 3% by weight on the basis of $MnO_2$, $WO_3$, $Nb_2O_5$ and $Ta_2O_5$.

According to the invention, the Q factor of the dielectric porcelain can be improved by making the material have a peak having half width of 120 cm$^{-1}$ or less in a range from 700 to 900 cm$^{-1}$ of laser Raman spectrum. When the dielectric porcelain is manufactured by forming a material prepared by a hydrothermal synthesis method, a metal alkoxide method or a coprecipitation method into a preform and firing the preform at a temperature in a range from 1550 to 1650° C. for 5 to 10 hours, the half width of the peak observed in a range from 700 to 900 cm$^{-1}$ of laser Raman spectrograph can be made not greater than 120 cm$^{-1}$.

Another dielectric resonator of the present invention comprises oxides, as a main component, containing at least Ti, Zr and Sn as metal elements and shows a peak having half width of 120 cm$^{-1}$ or Less in a range from 700 to 900 cm$^{-1}$ of laser Raman spectrum.

The dielectric porcelain preferably comprises oxides, as a main component, containing at least Ti, Zr and Sn as metal elements, and in case that a compositional formula of the oxides is represented by $hTiO_2 \cdot iZrO_2 \cdot jSnO_2$, molar ratios h, i and j satisfy the following relationships:

$$0.30 \leq h \leq 0.60;$$

$$0.25 \leq i \leq 0.60;$$

$$0.025 \leq j \leq 0.20;$$

and $$h+i+j=1.$$

The dielectric resonator of the present invention is made by disposing the dielectric porcelain described above between a pair of input and output terminals so as to function through electromagnetic coupling.

Other objects and advantages of the present invention will be made apparent from the following description.

DETAILED DESCRIPTION OF THE INVENTION

The present invention will now be described in detail below. The dielectric porcelain of the present invention refers to a sintered material made by firing a preform of a porcelain. In order to obtain a Q factor of a higher value, it is important that the material is a polycrystalline material of which main component is an oxide containing at least a rare earth element (Ln), Al, M (M represents Ca and/or Sr) and Ti as metal elements, wherein thickness of the grain boundary layer is 20 nm or less.

The statement that the dielectric porcelain of the present invention comprises a polycrystalline material consisting of oxides, as a main component, containing at least a rare earth element (Ln), Al, M (M represents Ca and/or Sr) and Ti as metal elements means that crystals that constitute the polycrystalline material are made of oxides containing a rare earth element (Ln), Al, M (M represents Ca and/or Sr) and Ti.

Among the crystals included in the dielectric porcelain of the present invention, the content of the polycrystalline material comprising, as the main component, the oxide containing at least a rare earth element (Ln), Al, M (M represents Ca and/or Sr) and Ti as metal elements is preferably 90% by volume or higher.

The dielectric porcelain of the present invention preferably contains at least a rare earth element (Ln), Al, M (M represents Ca and/or Sr) and Ti as metal elements in the total amount of 85% or more by weight on the basis of $LnO_{(X+3)/2}$ ($3 \leq X \leq 4$), $Al_2O_3$, MO (M represents Ca and/or Sr) and $TiO_2$.

The crystals made of the main components described above are preferably perovskite crystals comprising a solid solution of $LnAlO_{(X+3)/2}$ ($3 \leq X \leq 4$) and $MTiO_3$ (M represents Ca and/or Sr), for example, comprising solid solution of at least one of $NdAlO_3$, $SmAlO_3$ and $LaAlO_3$, and at least one of $CaTiO_3$ and $SrTiO_3$.

In order to improve the Q factor of the dielectric porcelain of the present invention, upper limit to the thickness of the grain boundary layer is 20 nm, preferably 10 nm and more preferably 5 nm. In order to achieve the highest possible value of Q factor, thickness of the grain boundary layer should be made substantially zero, in other words the grain boundary layer should be eliminated.

Figure 2A:
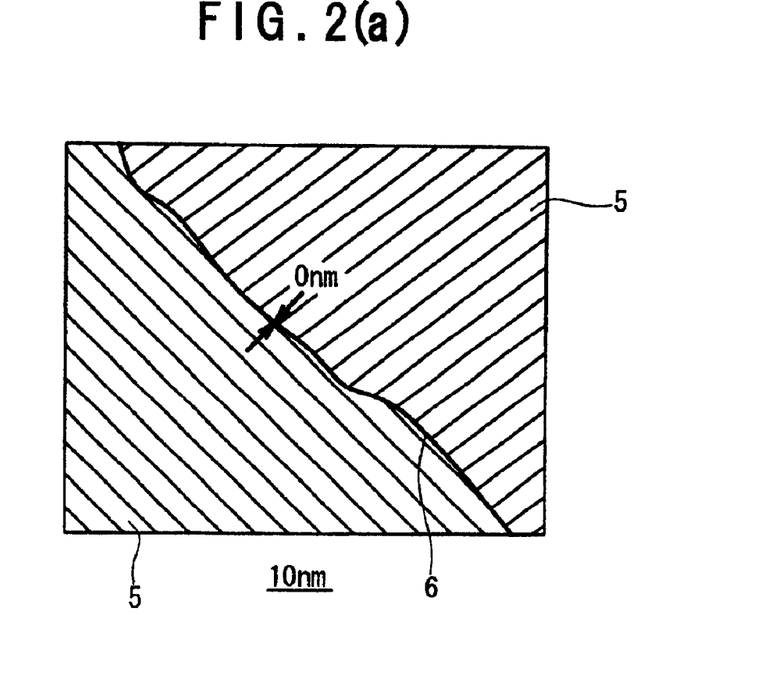
FIGS. 2(a) and (b) are schematic diagrams of the crystal lattice of the dielectric porcelain of the present invention observed with a transmission electron microscope.
Figure 2B:
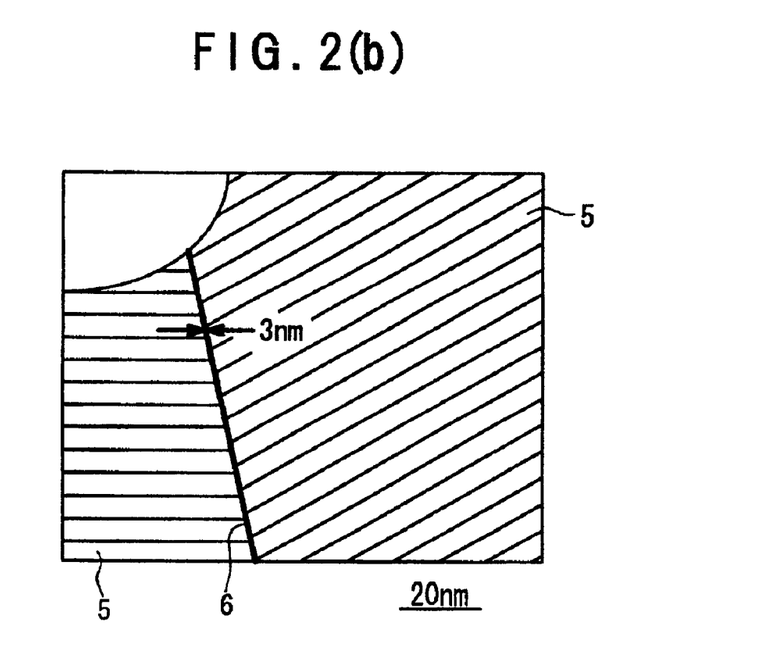

FIG. 2 schematically shows the crystal lattice of the dielectric porcelain of the present invention observed with a transmission electron microscope. FIG. 2(a) shows a case where grain boundary layer 6 between two crystal grains 5, 5 is zero, meaning that the grain boundary layer does not substantially exist. FIG. 2(b) shows a case where thickness of the grain boundary layer 6 between two crystal grains 5, 5 is 3 nm.

Crystal structure of the grain boundary layer 6 comprises at least one selected from, for example, $SrLaAlO_3$, $Sr_4Ti_3O_{10}$ and $Sr_2TiO_4$, $Sr_3Al_2O_7$, $SrLa_2Ti_{14}O_{12}$, $SrAl_2O_4$, $Nd_2Ti_2O_7$, and $SrAl_4O_7$. In case there is no grain boundary layer, however, there exists no grain boundary layer made in the crystal structure of the grain boundary layer in the interface between adjacent crystal grains.

The reason for the high Q factor being obtained by setting the thickness of the grain boundary layer within the range of the present invention is assumed as follows.

The dielectric porcelain of the present invention comprises a polycrystalline material. Electromagnetic wave propagating in the polycrystalline material attenuates in the boundary of large grains that cause significant dielectric loss. The electromagnetic energy lost in the attenuation is transformed into thermal energy, thus resulting in a decrease in the Q factor. Q factor decreases particularly when there is a grain boundary layer of large dielectric loss between grains. It is considered that the thinner the grain boundary layer, the less the attenuation of the electromagnetic wave and hence the smaller the dielectric loss, thus achieving a dielectric porcelain of higher Q factor.

The dielectric porcelain of the present invention can be made to have excellent dielectric characteristics which are particularly suitable for resonators, by setting the thickness of the grain boundary layer of the crystal made of the main components described above to 20 nm or less.

The rare earth element (Ln) contained in the dielectric porcelain of the present invention is preferably in the form of oxide of at least one selected from the group consisting of Y, La, Ce, Pr, Nd, Sm, Eu, Gd, Tb, Dy, Ho, Er and Yb. In order to obtain a high Q factor, the rare earth metal is preferably at least one selected from La, Nd, Sm, Eu, Gd and Dy. In order to obtain a further higher Q factor, the rare earth element is more preferably at least one selected from La, Nd and Sm. According to the present invention, La is most preferably used among the rare earth elements, in order to increase the Q factor.

It is important, in the dielectric porcelain of the present invention, that at least part of the oxide of Al exists in the form of crystal comprising at least one of $\alpha$-$Al_2O_3$, $\beta$-$Al_2O_3$ and $\theta$-$Al_2O_3$. In order to improve the Q factor, it is particularly desirable that at least part of the oxide of Al exists in the form of $\beta$-$Al_2O_3$ and/or $\theta$-$Al_2O_3$ and at least part of the oxide of Al does not include crystal of $\alpha$-$Al_2O_3$.

In case the dielectric porcelain of the present invention contains $\beta$-$Al_2O_3$ and/or $\theta$-$Al_2O_3$, it is desirable that the crystal comprising $\beta$-$Al_2O_3$ and/or $\theta$-$Al_2O_3$ is made of at least one selected from $La_2O_3 \cdot 11Al_2O_3$, $Nd_2O_3 \cdot 11Al_2O_3$, $CaO \cdot 6Al_2O_3$, and $SrO \cdot 6Al_2O_3$. Also it is preferable that the crystal structure of $\beta$-$Al_2O_3$ included in the dielectric porcelain of the present invention comprises $\beta$-$Al_2O_3$ defined as No. 10-0414 of JCPDS-ICDD, and the crystal structure of $\theta$-$Al_2O_3$ comprises $\theta$-$Al_2O_3$ defined as No. 11-0517 of JCPDS-ICDD. $\beta$-$Al_2O_3$ included in the dielectric porcelain of the present invention may also be $\beta'$-$Al_2O_3$ and/or $\beta''$-$Al_2O_3$.

The reason why the Q factor of the dielectric porcelain of the present invention can be made higher is presumably because sufficient solid solution of the elements included in the perovskite crystal is formed when at least part of the oxide of Al exists in the form of crystal consisting of at least one of $\alpha$-$Al_2O_3$, $\beta$-$Al_2O_3$ and $\theta$-$Al_2O_3$, thus accelerating the ordering of the perovskite crystal structure.

Presence of crystals formed from the main components described above in the dielectric porcelain of the present invention, presence of crystals of $\alpha$-$Al_2O_3$, $\beta$-$Al_2O_3$ and $\theta$-$Al_2O_3$ and thickness of the grain boundary layer are examined by means of a transmission electron microscope, analysis of selected area electron diffraction image, measurement by energy-dispersive X-ray spectroscopic analysis (EDS analysis), or microscopic X-ray diffraction method. Observation with transmission electron microscope, analysis of selected area electron diffraction image and measurement by energy-dispersive X-ray spectroscopic analysis (EDS analysis) are carried out, for example, in the following steps (A) to (D).

(A) Determine the elements included in the inner crystal structure of the dielectric porcelain and identify the crystal structure.

(B) When the crystal identified in the step (A) contains at least rare earth element (Ln), Al, M (M represents Ca and/or Sr) and Ti, this crystal is regarded as the crystal formed from the main components described above. Crystal having a structure of at least one of $\alpha$-$Al_2O_3$, $\beta$-$Al_2O_3$ and $\theta$-$Al_2O_3$ is not regarded as the crystals formed from the main components of the dielectric porcelain of the present invention.

(C) Crystal of which crystal structure having been identified in the step (A) is at least one of $\alpha$-$Al_2O_3$, $\beta$-$Al_2O_3$ and $\theta$-$Al_2O_3$ is regarded as the crystal of at least one of $\alpha$-$Al_2O_3$, $\beta$-$Al_2O_3$ and $\theta$-$Al_2O_3$ included in the dielectric porcelain of the present invention. The EDS analysis, for example, allows it to determine whether the crystal of at least one of $\alpha$-$Al_2O_3$, $\beta$-$Al_2O_3$ and $\theta$-$Al_2O_3$ contains relatively higher content of Al and/or relatively less content of Ti than the crystals formed from the main components described above.

(D) The thickness of the grain boundary layer included in the dielectric porcelain of the present invention is determined by observing the lattice image obtained with, for example, a transmission electron microscope to measure the thickness of the grain boundary layer between adjoining crystal grains for a plurality of grain boundary layers of the crystal, and averaging the measured values. When observing the lattice image, it is preferable to observe the interfaces where fringes of the grain boundaries do not cross each other.

The dielectric porcelain of the present invention preferably contains at least rare earth element (Ln), Al, M (M represents Ca and/or Sr) and Ti as metal elements in a composition of $aLn_2O_x \cdot bAl_2O_3 \cdot cMO \cdot dTiO_2$ ($3 \leq x \leq 4$) in terms of molar ratio, a, b, c and d satisfying the following relationships:

$$0.056 \leq a \leq 0.214;$$

$$0.056 \leq b \leq 0.214;$$

$$0.286 \leq c \leq 0.500;$$

$$0.230 < d < 0.470;$$

and $$a+b+c+d=1.$$

The restrictions on the values of a, b, c and d, described above are set in the dielectric porcelain of the present invention for the following reasons.

The range of $0.056 \leq a \leq 0.214$ is chosen because this range gives a large value of $\epsilon r$, high Q factor and smaller absolute value of temperature coefficient $\tau_f$ of the resonant frequency. More preferably, the lower limit of the value of a is 0.078 and the upper limit is 0.1866.

The range of $0.056 \leq b \leq 0.214$ is chosen because this range gives a large value of $\epsilon r$, high Q factor and smaller absolute value of $\tau_f$. More preferably, the lower limit of the value of b is 0.078 and the upper limit is 0.1866.

The range of $0.286 \leq c \leq 0.500$ is chosen because this range gives a large value of $\epsilon r$, high Q factor and smaller absolute value of $\tau_f$. More preferably, the lower limit of the value of c is 0.330 and the upper limit is 0.470.

The range of $0.230 < d < 0.470$ is chosen because this range gives a large value of $\epsilon r$, high Q factor and smaller absolute value of $\tau_f$. More preferably, the lower limit of the value of d is 0.340 and the upper limit is 0.450.

According to the present invention, in order to obtain higher Q factor, it is preferable that a, b, c and d satisfy the relationship of $0.75 \leq (b+d)/(a+c) \leq 1.25$. In order to obtain a further higher value of Q factor, the lower limit of $(b+d)/(a+c)$ is preferably 0.85 and the upper limit of $(b+d)/(a+c)$ is preferably 1.15.

The dielectric porcelain of the present invention contains at least one selected from Mn, W, Nb and Ta as metal elements in proportion from 0.01 to 3% by weight on the basis of $MnO_2$, $WO_3$, $Nb_2O_5$ and $Ta_2O_5$. The reason for containing at least one selected from Mn, W, Nb and Ta in the proportion from 0.01 to 3% by weight on the basis of $MnO_3$, $WO_3$, $Nb_2O_5$ and $Ta_2O_5$ is because this results in a significant improvement in Q factor. In order to improve the Q factor further, it is preferable to include at least one selected from Mn, W, Nb and Ta in proportion from 0.02 to 2% by weight on the basis of $MnO_2$, $WO_3$, $Nb_2O_5$ and $Ta_2O_5$, especially Mn content in a range from 0.02 to 0.5% by weight on the basis of $MnO_2$.

The method for manufacturing the dielectric porcelain of the present invention comprises, for example, the following steps (1a) to (7a).

(1a) An aqueous solution of nitrate of a rare earth element (Ln), for example La $(NO_3)_3.6H_2O$, and the aqueous solution of oxalic acid are mixed so as to form and precipitate the oxalate of the rare earth element (Ln). After filtering, the precipitate of the oxalate of the rare earth element (Ln) is dried and then fired at a temperature from 400 to 600° C. in an oxidizing atmosphere, thereby to synthesize an oxide "A" of the rare earth element (Ln), for example $La_2O_3$, having a mean particle size of 10 to 80 nm.

(2a) A nitrate of Al, for example Al $(NO_3)_3.6H_2O$, is dissolved in ethylene glycol and dried, with the resultant solid being fired at a temperature from 700 to 900° C. in an oxidizing atmosphere, thereby to synthesize an oxide "B" of Al, for example $Al_2O_3$, having a mean particle size of 10 to 80 nm.

(3a) A mixture of the oxide "A" and the oxide "B" prepared in a ball mill is calcined at a temperature from 800 to 1000° C., thereby to produce a calcined powder "C" having a mean particle size from 20 to 100 nm.

(4a) MO (M represents Ca and/or Sr) and $TiO_2$ having a mean particle size in a range from 0.6 to 2 μm are mixed uniformly and calcined at a temperature from 1100 to 1300° C., thereby to produce a calcined powder "D".

(5a) Manganese carbonate ($MnCO_3$), tungsten oxide ($WO_3$), niobium oxide ($Nb_2O_5$) and tantalum oxide ($Ta_2O_5$) having a mean particle size of 1 μm or smaller are weighed in desired proportions and mixed with the calcined powder "C" and the calcined powder "D" in wet mixing process.

(6a) After adding 3 to 10% by weight of a binder, the mixture is dehydrated and then granulated or graded by a known method such as spray dry process. The granulated or graded powder is formed into a desired shape by a known forming method such as pressured molding, cold static pressure forming process or extrusion molding process. The granulated or graded mixture is not limited to a solid form such as powder, and may also be slurry or a liquid mixture. In this case, the liquid may be other than water, for example, IPA (isopropyl alcohol), methanol, ethanol, toluene, acetone or the like.

(7a) The preform obtained in the above step is fired at a temperature from 1400 to 1550° C., thereby to produce the dielectric porcelain of the present invention.

The reason why thickness of the grain boundary layer can be made smaller and Q factor can be improved by the manufacturing process described above has not been clearly elucidated, but presumably as follows.

As described previously, the crystals made of the main components described above are preferably perovskite crystals comprising solid solution of $LnAlO_{(X+3)/2}$ ($3 \leq X \leq 4$) and $MTiO_3$ (M represents Ca and/or Sr). When the calcined powder of $LnAlO_{(X+3)/2}$ ($3 \leq X \leq 4$) and $MTiO_3$ (M represents Ca and/or Sr) having similar mean particle sizes are dry-pressed under a pressure of, for example, 1 ton/cm², the preform made of $LnAlO_{(X+3)/2}$ ($3 \leq X \leq 4$) is more difficult to sinter requiring higher sintering temperature than the preform made of $MTiO_3$ (M represents Ca and/or Sr). For example, there is such a difference in the sintering temperature as about 1600° C. in the case of $NdAlO_3$ and about 1400° C. in the case of $SrTiO_3$.

When there is such a difference in the sintering temperature, crystals consisting mainly of $MTiO_3$ (M represents Ca and/or Sr) grow at a temperature, for example about 1350° C., that is 100 to 200° C. lower than the temperature at which the solid solution is sufficiently formed during firing. Thus it is assumed that the solid solution cannot be sufficiently formed even when the temperature is raised to a temperature at which the solid solution should be sufficiently formed, for example, 1600° C. This may result in an increasing proportion of elements that do not contribute to the formation of the solid solution, thus leading to the formation of grain boundary layers that include crystal phase other than the solid solution and to a decrease in the Q factor.

Preventing the Q factor from decreasing as described above requires such a manufacturing method described above, comprising the step of producing the calcined powder "C" having a mean particle size of 20 to 100 nm by mixing the oxide "A" of the rare earth element (Ln) of a mean particle size as small as 10 to 80 nm and the oxide "B" of Al of a mean particle size as small as 10 to 80 nm and calcining the mixture at a temperature from 800 to 1000° C., the step of mixing MO (M represents Ca and/or Sr) and $TiO_2$ having large mean particle sizes in a range from 0.6 to 2 μm and calcining the mixture at a temperature from 1100 to 1300° C. thereby to produce the calcined powder "D", followed by mixing of the calcined powder "C" and the calcined powder "D", granulation, forming and firing at a temperature from 1400 to 1550° C. By controlling the mean particle sizes of the oxide "A" of the rare earth element and the oxide "B" of Al within the range from 10 to 80 nm so as to make it easier to sinter, and controlling the mean particle sizes of the MO (M represents Ca and/or Sr) and $TiO_2$ within a range from 0.6 to 2 μm so as to lower the sintering activity thereby to make it difficult to sinter, it is supposed that sintering temperatures of $LnAlO_{(X+3)/2}$ ($3 \leq X \leq 4$) and $MTiO_3$ (M represents Ca and/or Sr) can be made substantially the same, thus accelerating the formation of the solid solution of $LnAlO_{(X+3)/2}$ ($3 \leq X \leq 4$) and $MTiO_3$ (M represents Ca and/or Sr) and reducing the thickness of the grain boundary layer.

It is also supposed that containing Mn, W, Nb and Ta in the proportion of 0.01 to 3% by weight on the basis of $MnO_2$, $WO_3$, $Nb_2O_5$ and $Ta_2O_5$ helps decrease the oxygen defects generated in the solid solution and improves Q factor further.

The dielectric porcelain of the present invention may also include ZnO, NiO, $Fe_2O_3$, $SnO_2$, $CO_3O_4$, $ZrO_2$, $LiCO_3$, $Rb_2CO_3$, $Sc_2O_3$, $V_2O_5$, CuO, $SiO_2$, $BaCO_3$, $MgCO_3$, $Cr_2O_3$, $B_2O_3$, $GeO_2$, $Sb_2O_5$, $Ga_2O_3$ or the like added thereto. These additives can be added in total amount of 5 parts by weight or less based on 100 parts by weight of the main component for the purpose of optimizing the values of εr and temperature coefficient $\tau_f$ of resonant frequency, although it depend on the kind of additive.

In order to improve the Q factor, the dielectric resonator of the present invention is preferably made in such a constitution that has a main component comprising oxides containing at least rare earth element (Ln), Al, M (M represents Ca and/or Sr) and Ti as metal elements and shows a peak having half width of 120 cm$^{-1}$ or less in a range from 700 to 900 cm$^{-1}$ of laser Raman spectrum. This makes it possible to achieve excellent dielectric characteristics that are suitable for the dielectric porcelain used to make a resonator.

The reason why high Q factor can be achieved by having a peak having half width of 120 cm$^{-1}$ or less in a range from 700 to 900 cm$^{-1}$ of laser Raman spectrum is supposedly because of sufficient progress achieved thereby in the formation of solid solution of elements that are included in the perovskite crystal comprising the solid solution of LnAlO$_{(X+3)/2}$ ($3 \leq X \leq 4$) and MTiO$_3$ (M represents Ca and/or Sr), which accelerates the ordering of the perovskite crystal structure. To achieve a particularly high value of Q factor, the half width is preferably 100 cm$^{-1}$ or less.

The peak observed in the range from 700 to 900 cm$^{-1}$ of laser Raman spectrum will be described here. When a material is irradiated with light of frequency $f_0$, scattered light may include components having frequencies of $f_0 \pm f_1$. This variation in the frequency is caused by the exchange of energy that has took place between the photons and the material irradiated therewith. This means that information such as lattice vibration of the crystal and energy levels of electrons can be obtained by measuring the frequency $f_1$. The scattering phenomenon that causes $f_1$ in a range from about 4000 to 1 cm$^{-1}$ is called the Raman scattering. Half width of a peak of $f_1$ varies depending on such factors as the lattice vibration of the crystal and the energy levels of electrons.

In the laser Raman spectrum of the dielectric resonator of the present invention, the peak having $f_1$ in the range from 700 to 900 cm$^{-1}$ is caused by such factors as the lattice vibration of the crystal and the energy levels of electrons in the perovskite crystal comprising the solid solution of LnAlO$_{(X+3)/2}$ ($3 \leq X \leq 4$) and MTiO$_3$ (M represents Ca and/or Sr), and the half width is supposed to decrease as the atoms that constitute the perovskite crystal and the solid solution are arranged orderly and the Q factor becomes higher. Q factor of the dielectric resonator of the present invention becomes higher when the half width of the peak in the range from 700 to 900 cm$^{-1}$ of laser Raman spectrum is 120 cm$^{-1}$ or less.

Now another embodiment of the present invention will be described below.

It is important that the dielectric resonator of another embodiment is made in such a constitution that has a main component comprising oxides containing at least Ti, Zr and Sn as metal elements and shows a peak having half width of 120 cm$^{-1}$ or less in a range from 700 to 900 cm$^{-1}$ of laser Raman spectrum.

The dielectric porcelain is also preferably made in such a constitution that has a main component comprising oxides containing at least Ti, Zr and Sn as metal elements in a composition of hTiO$_2$.iZrO$_2$.jSnO$_2$ in terms of molar ratio wherein the factors h, i and j satisfy the following relationships:

$0.30 \leq h \leq 0.60$;

$0.25 \leq i \leq 0.60$;

$0.025 \leq j \leq 0.20$;

and $h+i+j=1$

The present invention sets the restrictions on the values of h, i and j, described above for the following reasons.

The range of $0.30 \leq h \leq 0.60$ is chosen because this range gives a large value of $\epsilon r$, high value of Q factor and smaller absolute value of temperature coefficient $\tau_f$ of the resonant frequency. A range of $0.35 \leq h \leq 0.55$ is more preferable.

The range of $0.25 \leq i \leq 0.60$ is chosen because this range gives a large value of $\epsilon r$, high value of Q factor and smaller absolute value of $\tau_f$. A range of $0.30 \leq h \leq 0.55$ is more preferable.

The range of $0.025 \leq j \leq 0.20$ is chosen because this range gives a large value of $\epsilon r$, high value of Q factor and smaller absolute value of $\tau_f$. A range of $0.05 \leq j \leq 0.015$ is more preferable.

The peak in the range from 700 to 900 cm$^{-1}$ of laser Raman spectrum of the dielectric resonator of the present invention, of which the main component comprises oxides containing at least Ti, Zr and Sn as metal elements will be described below.

In the laser Raman spectrum of the dielectric resonator, the peak in the range from 700 to 900 cm$^{-1}$ is caused by such factors as the lattice vibration of the TiO$_2$—ZrO$_2$—SnO$_2$ solid solution crystal and the energy levels of electrons, while the half width of the peak becomes smaller as the atoms that constitute the solid solution are arranged orderly and the Q factor becomes higher. According to the present invention, the value of Q factor becomes higher when the half width of the peak in the range from 700 to 900 cm$^{-1}$ of laser Raman spectrum is 120 cm$^{-1}$ or less in the dielectric resonator that has the main component consisting of oxides containing at least Ti, Zr and Sn as metal elements.

The dielectric porcelain having half width as small as 120 cm$^{-1}$ or less can be manufactured, for example, in either first manufacturing method or second manufacturing method described below.

The first manufacturing method includes the step of synthesizing and mixing LnAlO$_{(X+3)/2}$ ($3 \leq X \leq 4$) and MTiO$_3$ (M represents Ca and/or Sr) by a wet process such as hydrothermal synthesis method, metal alkoxide process or coprecipitation method and firing a preform made of this mixture at a temperature from 1550 to 1650° C. for 5 to 10 hours. The mean particle size of the synthesized material is set to be not larger than 1 $\mu$m, preferably not larger than 0.5 $\mu$m.

The second manufacturing method includes the step of synthesizing and mixing ZrTiO$_4$ and SnTiO$_4$ by a wet process such as hydrothermal synthesis method, metal alkoxide method or coprecipitation method and firing a preform made of this mixture at a temperature from 1300 to 1600° C. for 5 to 10 hours. The mean particle sizes of the synthesized materials ZrTiO$_4$ and SnTiO$_4$ are set to be not larger than 1 $\mu$m, preferably not larger than 0.5 $\mu$m.

When either the first or the second manufacturing method is employed, half width of the peak observed in a range from 700 to 900 cm$^{-1}$ of laser Raman spectrum can be made not greater than 120 cm$^{-1}$, thereby improving the Q factor.

It would be made possible to improve the Q factor by employing the first or second manufacturing method supposedly for the following reason. A dielectric material operating in the microwave region is an ion bonding crystal having normal dielectric property. Since dielectric property in the microwave region is based mainly on ionic polarization, it is necessary to reduce lattice defects and form an ordered crystal structure in a porcelain. For example, it is necessary to avoid the occurrence of lattice defects by using the synthesized material made by a wet process and fire the material under such conditions that allow it to form an ordered crystal lattice which is less prone to the occurrence of lattice defects.

The dielectric material made of the synthesized material described above would include less lattice defects with the atoms therein arranged orderly. A dielectric material made without using the synthesized material described above includes much lattice defects resulting in lower Q factor.

It is also believed that oxygen defects can be decreased further and the Q factor can be improved further by containing Mn, W, Nb and Ta in the proportion of 0.01 to 3% by weight on the basis of MnO$_2$, WO$_3$, Nb$_2$O$_5$ and Ta$_2$O$_5$.

The first manufacturing method specifically comprises, for example, the following steps (1b) to (4b).

(1b) Water is added to a mixture of a rare earth element alkoxide solution and aluminum alkoxide solution so as to hydrolyze the alkoxide, thereby to obtain a perovskite type synthesized material I consisting of the oxides of the rare earth element and aluminum having a mean particle size of 1 μm or less. Meanwhile water is added to a mixture of calcium alkoxide solution and/or strontium alkoxide solution and titanium alkoxide solution so as to hydrolyze the alkoxide, thereby to obtain a perovskite type synthesized material II consisting of oxides of calcium and/or strontium and titanium having a mean particle size of 1 μm or less.

(2b) The synthesized material I, the synthesized material II, manganese carbonate ($MnCO_3$), tungsten oxide ($WO_3$), niobium oxide ($Nb_2O_5$) and tantalum oxide ($Ta_2O_5$), which have a mean particle size of 1 μm or smaller, are weighed in desired proportions and mixed in wet mixing process.

(3b) After adding 3 to 10% by weight of a binder, the mixture is dehydrated and then granulated or graded by a known method, for example spray dry process. The granulated or graded powder is formed into a desired shape by a known forming method such as pressured molding process, cold static pressure forming process or extrusion molding process. The granulated or graded mixture is not limited to a solid form such as powder, and may also be slurry or a liquid mixture. In this case, the liquid may be other than water, for example, IPA (isopropyl alcohol), methanol, ethanol, toluene, acetone or the like.

(4b) The preform obtained in the above step is fired at a temperature from 1550 to 1650° C. for 5 to 10 hours, thereby to produce the dielectric porcelain of the present invention.

The second manufacturing method specifically comprises, for example, the following steps (5b) to (7b).

(5b) Water is added to a mixture of zirconium alkoxide solution, titanium alkoxide solution and tin alkoxide solution so as to hydrolyze the alkoxide, thereby to obtain a synthesized material III consisting of oxides of zirconium, titanium and tin having a mean particle size of 1 μm or less.

(6b) After adding 3 to 10% by weight of a binder to the synthesized material III, the mixture is dehydrated and then granulated or graded by a known method, for example spray dry process. The granulated or graded powder is formed into a desired shape by a known forming method such as pressured molding process, cold static pressure forming process or extrusion molding process. The granulated or graded mixture is not limited to a solid form such as powder, and may also be slurry or a liquid mixture. In this case, the liquid may be other than water, for example, IPA (isopropyl alcohol), methanol, ethanol, toluene, acetone or the like.

(7b) The preform obtained in the above step is fired at a temperature from 1300 to 1600° C. for 5 to 10 hours, thereby to produce the dielectric porcelain of the present invention.

The dielectric porcelain of the present invention may also include ZnO, NiO, $Co_3O_4$, $LiCO_3$, $Rb_2CO_3$, $Sc_2O_3$, $V_2O_5$, CuO, $SiO_2$, $BaCO_3$, $MgCO_3$, $Cr_2O_3$, $B_2O_3$, $GeO_2$, $Sb_2O_5$, $Ga_2O_3$ or the like added thereto. These additives can be added in total amount of 5 parts by weight or less based on 100 parts by weight of the main component for the purpose of optimizing the values of εr and temperature coefficient $\tau_f$ of the resonant frequency, although it depends on the kind of the additive. Particularly for the dielectric porcelain of the present invention that contains $TiO_2$, $ZrO_2$ and $SnO_2$, it is desirable to add each of at least one of NiO and ZnO at 1% by weight or less.

Figure 1:
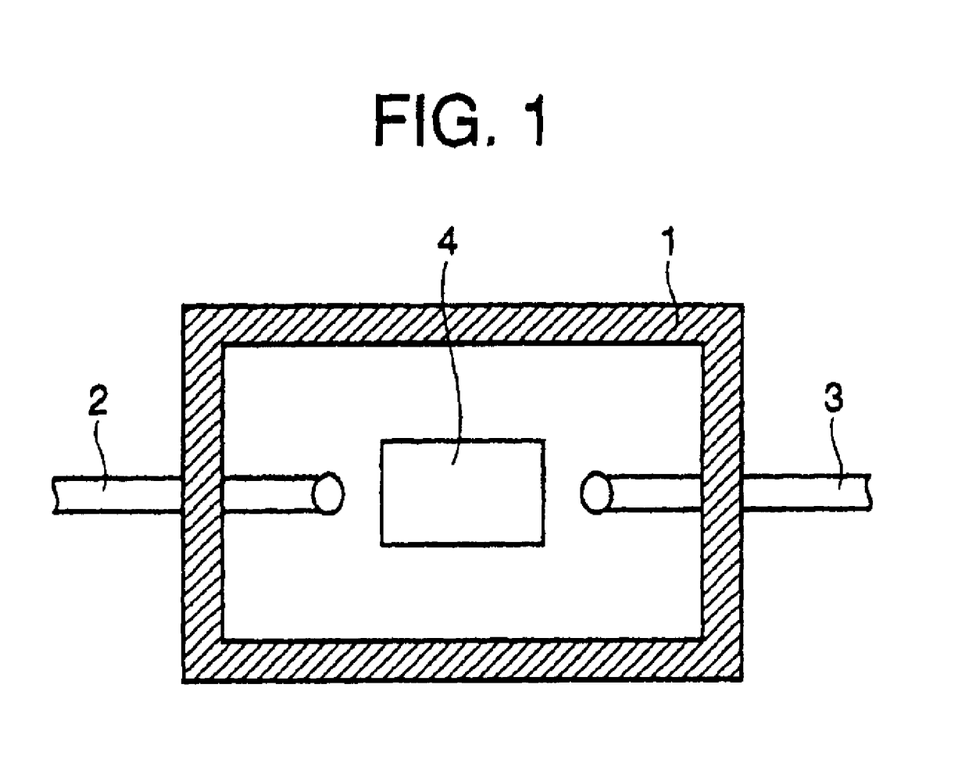
FIG. 1 is a sectional view showing an example of the dielectric resonator of the present invention.

The dielectric porcelain of the present invention can be used most preferably for a dielectric resonator. FIG. 1 schematically shows a dielectric resonator operating in TE mode. The dielectric resonator shown in FIG. 1 comprises an input terminal 2 and an output terminal 3 disposed on opposing inner walls of a metal case 1, and the dielectric porcelain 4 of the present invention disposed between the input terminal 2 and the output terminals 3. In the dielectric resonator operating in TE mode, when microwave is input through the input terminal 2, the microwave is confined in the dielectric resonator 4 by reflections at the interfaces between the dielectric resonator 4 and the free space, thus oscillating at a particular frequency. The oscillation is electromagnetically coupled with the output terminal 3 and is provided as an output signal.

The dielectric porcelain of the present invention may also be applied to other resonators such as coaxial resonator or strip-line resonator which uses TEM mode, and to a dielectric resonator operating in TE mode, as a matter of course. A dielectric resonator can be made also by attaching the input terminal 2 and the output terminals 3 directly to the dielectric porcelain 4.

The dielectric porcelain 4, which is a resonating medium made of the dielectric porcelain of the present invention in a predetermined shape, may be formed in any shape such as rectangular parallelepiped, cube, sheet, disk, cylinder or polygonal prism, as long as it allows resonance to take place therein. The input high frequency signal has a frequency of about 1 to 500 GHz, and resonance frequency is preferably in a range from about 2 GHz to 80 GHz from the view point of practical operation.

Thus according to the present invention, the dielectric porcelain having high Q factor and relative dielectric constant εr which has a large value in a high frequency region can be obtained by using a polycrystalline material of which main component is an oxide containing at least rare earth element (Ln), Al, M (M represents Ca and/or Sr) and Ti as metal elements, wherein thickness of the grain boundary layer is 20 nm or less, and preferably showing a peak having half width of 120 $cm^{-1}$ or less in a range from 700 to 900 $cm^{-1}$ of laser Raman spectrum. The dielectric porcelain made as described above can be applied preferably to resonators used in microwave and millimeter wave regions, dielectric substrate for MIC, dielectric waveguide, dielectric antenna, and other electronic components.

EXAMPLES

Example 1

Samples according to the present invention were made in the following steps (1c) to (5c).

(1c) An aqueous solution of nitrate of a rare earth element (Ln) and the aqueous solution of oxalic acid were mixed so as to form and precipitate oxalate of the rare earth element (Ln). After filtering, precipitate of the oxalate of the rare earth element (Ln) was subjected to heat treatment at 500° C. in air atmosphere, thereby to synthesize an oxide of the rare earth element (Ln) having a mean particle size of 10 to 80 nm.

(2c) Nitrate of Al was dissolved in ethylene glycol and dried, with the resultant solid being subjected to heat treatment at 800° C. in air atmosphere, thereby to synthesize $Al_2O_3$ having a mean particle size of 10 to 80 nm.

(3c) The mixture of the oxide of the rare earth element obtained in the step (1c) and $Al_2O_3$ obtained in the step (2c) was prepared in a ball mill and was calcined at 900° C., thereby to produce calcined powder having a mean particle size of 30 to 90 nm.

(4c) MO (M represents Ca and/or Sr) and $TiO_2$ having a mean particle size in a range from 0.8 to 1.5 µm were mixed uniformly and calcined at a temperature from 1100 to 1300° C., thereby to produce calcined powder having a mean particle size in a range from 3.0 to 6.0 µm.

(5c) Manganese carbonate ($MnCO_3$), tungsten oxide ($WO_3$), niobium oxide ($Nb_2O_5$) and tantalum oxide ($Ta_2O_5$) having a mean particle size of 1 µm or smaller were weighed in the proportions shown in Table 1 and mixed with the calcined powder obtained in the step (3c) and the calcined powder obtained in the step (4c) in wet mixing process in a ball mill, thus obtaining a slurry. After adding 5% by weight of a binder, the slurry was graded by spray dry process. The graded powder was formed into a disk shape under a pressure of about 1 ton/cm² before being degreased. The degreased preform was fired at a temperature from 1400 to 1550° C. in air atmosphere for 5 to 10 hours.

The disk surface (principal plane) of the sintered material thus obtained was polished to make it flat, and was subjected to ultrasonic cleaning in acetone. After drying at 150° C. for one hour, the sample was measured by cylinder resonance method to determine the relative dielectric constant εr, Q factor and the temperature coefficient $\tau_f$ of resonant frequency, at measuring frequencies of 3.5 to 4.5 GHz. The value of Q factor was converted to a value at 1 GHz based on the relation of (Q factor)×(Measuring frequency f)=constant, that holds generally for dielectric materials used in the microwave region. The values of temperature factor $\tau_f$ of resonant frequency at temperatures from 25 to 85° C. were calculated by taking the resonant frequency at 25° C. as the reference.

The sintered material was also machined using an ion thinning apparatus manufactured by Technoorg Linda, and observed by means of a transmission electron microscope JEM2010F of JEOL and the EDS analyzer Voyager IV of Noran Instruments, so as to determine the presence of crystals formed from the main components described previously included in the dielectric porcelain of the present invention, presence of crystals consisting of $\alpha$-$Al_2O_3$, $\beta$-$Al_2O_3$ and $\theta$-$Al_2O_3$ and thickness of the grain boundary layer. The following results (1d) to (5d) were obtained from these analyses and measurements.

(1d) The elements included in the crystal and the crystal structure were identified for 20 to 40 pieces of crystal included in each sample.

(2d) When the crystal identified in the step (1d) included at least a rare earth element (Ln), Al, M (M represents Ca and/or Sr) and Ti, then the crystal was regarded as the crystals formed from the main components described above. Crystal formed from the main components described above was identified as a structure of at least one of hexagonal crystal $LaAlO_3$, hexagonal crystal $AlNdO_3$, orthorhombic crystal $CaTiO_3$, cubic crystal $SrTiO_3$ and cubic crystal $LaTiO_3$.

(3d) Crystal of which crystal structure was identified in the step (1d) comprising at least one of $\alpha$-$Al_2O_3$, $\beta$-$Al_2O_3$ and $\theta$-$Al_2O_3$ was regarded as the crystal of at least one of $\alpha$-$Al_2O_3$, $\beta$-$Al_2O_3$ and $\theta$-$Al_2O_3$ included in the sample of the present invention. In case the sample of the present invention included crystal of $\beta$-$Al_2O_3$, the crystal structure of $\beta$-$Al_2O_3$ was identified as $\beta$-$Al_2O_3$ defined as No.10-0414 of JCPDS-ICDD. In case the sample of the present invention included crystal of $\theta$-$Al_2O_3$, the crystal structure of this crystal was identified as $\theta$-$Al_2O_3$ defined as No.11-0517 of JCPDS-ICDD. It was also verified through the EDS analysis that the crystals of $\alpha$-$Al_2O_3$, $\beta$-$Al_2O_3$ and $\theta$-$Al_2O_3$ included in the sample of the present invention included more content of Al and/or less content of Ti than the crystals formed from the main components described above.

(4d) Thickness of the grain boundary layer between adjoining crystal grains was measured for 10 to 40 pieces of crystal, and the measured values were averaged.

(5d) Through examination of the samples including grain boundary layers to identify the crystal structure, it was found that the grain boundary layer comprised at least one of $SrLaAlO_3$, $Sr_4Ti_3O_{10}$, $Sr_2TiO_4$, $Sr_3Al_2O_7$, $SrLa_2Ti_{14}O_{12}$, $SrAl_2O_4$, $Nd_2Ti_2O_7$ and $SrAl_4O_7$.

These results are summarized in Tables 1 and 2. The notation in Table 1, for example "0.2Y·0.8La" for the proportion of rare earth elements indicates that Y and La are included in proportions of 0.2:0.8 in molar ratio, and "La" indicates that La is used for the rare earth element in the sample. Sample marked with ○ in Table 2 is a sample observed to include a crystal of at least one of $\alpha$-$Al_2O_3$, $\beta$-$Al_2O_3$ and $\theta$-$Al_2O_3$, and sample marked with × is a sample observed to not include a crystal of at least one of $\alpha$-$Al_2O_3$, $\beta$-$Al_2O_3$ and $\theta$-$Al_2O_3$.

As will be apparent from Table 1 and 2, the samples Nos.1 to 48 prepared according to the present invention showed excellent characteristics of relative dielectric constant εr in a range from 30 to 48, Q factor not less than 43000 as converted to the value at 1 GHz, particularly Q factor as high as 46000 or over when εr is not less than 40, and $\tau_f$ within ±30 (ppm/° C.).

Meanwhile porcelains (samples Nos.49 to 56) which were out of the scope of the present invention were made as follows.

Powders of oxide of rare earth element, aluminum oxide ($Al_2O_3$), calcium carbonate ($CaCO_3$), strontium carbonate ($SrCO_3$) and titanium oxide ($TiO_2$) having a mean particle size in a range from 3 to 10 µm were weighed in the proportions a, b, c and d in terms of molar ratio shown in Table 1 and mixed with pure water. The mixture was subjected to wet mixing process and crushed in a ball mill till the mean particle size was reduced to 1 to 3 µm. The mixture was dried and then calcined at 1200° C. for 2 hours to obtain a calcined powder. This calcined powder was mixed with manganese carbonate ($MnCO_3$), tungsten oxide ($WO_3$), niobium oxide ($Nb_2O_5$) and tantalum oxide ($Ta_2O_5$) in proportions of weight percent shown in Table 1. With pure water being added, the mixture was subjected to wet mixing process and crushing in a ball mill.

After adding a binder, the slurry was graded by spray dry process. The graded powder was formed into a disk shape under a pressure of about 1 ton/cm² before being degreased. The degreased preform was fired at a temperature from 1630 to 1680° C. in air atmosphere for 5 to 10 hours.

The porcelains (samples Nos.49 to 56) which were out of the scope of the present invention showed grain boundary layer thicker than 20 nm, a low value of εr, a low value of Q factor and/or a large absolute value of $\tau_f$.

TABLE 1

| Sample No. | Proportion of rare earth element | Proportions of CaO and SrO | | Ln₂Oₓ a | Al₂O₃ b | MO = CaO + SrO c | TiO₂ d | (b + d) / (a + c) | MnO₂ (wt. %) | WO₃ (wt. %) | Nb₂O₅ (wt. %) |
|---|---|---|---|---|---|---|---|---|---|---|---|
| | | CaO | SrO | | | | | | | | |
| 1 | 0.2Y—0.8La | 0.00 | 1.00 | 0.0800 | 0.0800 | 0.4400 | 0.4000 | 0.923 | 0.01 | 0.00 | 0.00 |
| 2 | 0.1Sm—0.9Nd | 0.45 | 0.55 | 0.1240 | 0.1300 | 0.3730 | 0.3730 | 1.012 | 1.00 | 0.00 | 0.00 |
| 3 | 0.4La—0.6Sm | 0.80 | 0.20 | 0.2140 | 0.2140 | 0.2860 | 0.2860 | 1.000 | 0.04 | 0.00 | 0.00 |
| 4 | Nd | 0.60 | 0.40 | 0.1250 | 0.1260 | 0.3300 | 0.4190 | 1.198 | 0.50 | 0.00 | 0.00 |
| 5 | 0.2La—0.8Nd | 0.90 | 0.10 | 0.1250 | 0.1250 | 0.4170 | 0.3330 | 0.845 | 0.30 | 0.00 | 0.00 |
| 6 | 0.5La—0.5Nd | 0.20 | 0.80 | 0.2090 | 0.2050 | 0.2860 | 0.3000 | 1.020 | 0.00 | 0.00 | 0.00 |
| 7 | 0.1Ce—0.9Sm | 0.40 | 0.60 | 0.1539 | 0.1661 | 0.3300 | 0.3500 | 1.067 | 0.00 | 0.00 | 0.01 |
| 8 | 0.1Ce—0.9Nd | 0.60 | 0.40 | 0.0560 | 0.0560 | 0.4580 | 0.4300 | 0.946 | 0.00 | 0.00 | 0.05 |
| 9 | 0.3Nd—0.7La | 0.10 | 0.90 | 0.0600 | 0.0610 | 0.4954 | 0.3836 | 0.801 | 0.00 | 0.00 | 0.00 |
| 10 | 0.1Pr—0.9Nd | 0.50 | 0.50 | 0.0941 | 0.1009 | 0.4600 | 0.3450 | 0.805 | 0.00 | 0.01 | 0.00 |
| 11 | 0.6Sm—0.4Nd | 0.70 | 0.30 | 0.0770 | 0.0770 | 0.4300 | 0.4160 | 0.972 | 0.00 | 0.05 | 0.00 |
| 12 | Sm | 0.80 | 0.20 | 0.0700 | 0.0560 | 0.4240 | 0.4500 | 1.024 | 0.00 | 0.08 | 0.00 |
| 13 | 0.2Sm—0.8Nd | 0.80 | 0.20 | 0.1320 | 0.1600 | 0.3270 | 0.3810 | 1.179 | 0.00 | 1.00 | 0.00 |
| 14 | 0.5Sm—0.5Nd | 0.40 | 0.60 | 0.1071 | 0.1090 | 0.3539 | 0.4300 | 1.169 | 0.00 | 1.20 | 0.00 |
| 15 | Eu | 0.90 | 0.10 | 0.0600 | 0.0600 | 0.5000 | 0.3800 | 0.786 | 0.00 | 0.00 | 0.00 |
| 16 | 0.8Eu—0.2Nd | 0.40 | 0.60 | 0.1400 | 0.1750 | 0.3350 | 0.3500 | 1.105 | 0.00 | 0.01 | 0.50 |
| 17 | Gd | 0.10 | 0.90 | 0.0600 | 0.0600 | 0.4105 | 0.4695 | 1.125 | 0.00 | 0.03 | 0.00 |
| 18 | 0.2Gd—0.8Nd | 0.80 | 0.20 | 0.0780 | 0.0780 | 0.4220 | 0.4220 | 1.000 | 0.00 | 0.08 | 0.00 |
| 19 | Dy | 0.40 | 0.60 | 0.1166 | 0.1166 | 0.4267 | 0.3401 | 0.841 | 0.00 | 1.00 | 1.00 |
| 20 | 0.1Dy—0.9Nd | 0.55 | 0.45 | 0.1098 | 0.1098 | 0.3902 | 0.3902 | 1.000 | 0.03 | 0.02 | 0.00 |
| 21 | 0.7Dy—0.3Nd | 1.00 | 0.00 | 0.0790 | 0.0790 | 0.4610 | 0.3810 | 0.852 | 0.03 | 0.00 | 0.00 |
| 22 | 0.1Sm—0.9La | 0.35 | 0.65 | 0.0881 | 0.0881 | 0.4119 | 0.4119 | 1.000 | 0.09 | 0.00 | 0.00 |
| 23 | 0.2Nd—0.8La | 0.40 | 0.60 | 0.1072 | 0.1072 | 0.4376 | 0.3480 | 0.836 | 1.00 | 0.00 | 0.00 |
| 24 | 0.1Gd—0.9Eu | 0.15 | 0.85 | 0.0884 | 0.0884 | 0.4100 | 0.4132 | 1.006 | 0.02 | 1.30 | 0.00 |
| 25 | 0.3Dy—0.7Eu | 0.55 | 0.45 | 0.1700 | 0.1760 | 0.3270 | 0.3270 | 1.012 | 0.00 | 0.00 | 0.00 |
| 26 | 0.9Nd—0.1La | 0.25 | 0.75 | 0.2130 | 0.2120 | 0.3440 | 0.2310 | 0.795 | 0.07 | 0.05 | 0.00 |
| 27 | La | 0.10 | 0.90 | 0.1000 | 0.1000 | 0.4000 | 0.4000 | 1.000 | 0.06 | 0.09 | 0.00 |
| 28 | 0.9Nd—0.1La | 0.45 | 0.55 | 0.1200 | 0.1220 | 0.3750 | 0.3830 | 1.020 | 0.01 | 0.00 | 0.00 |
| 29 | La | 0 | 1 | 0.1610 | 0.1620 | 0.3390 | 0.3380 | 1.000 | 0.00 | 0.00 | 0.00 |
| 30 | La | 0 | 1 | 0.1305 | 0.1599 | 0.3546 | 0.3550 | 1.061 | 0.05 | 0.00 | 0.00 |
| 31 | La | 0 | 1 | 0.2101 | 0.1691 | 0.3456 | 0.2752 | 0.800 | 1.00 | 0.00 | 0.00 |
| 32 | La | 0 | 1 | 0.1386 | 0.1441 | 0.3765 | 0.3408 | 0.941 | 0.50 | 0.00 | 0.00 |
| 33 | La | 0 | 1 | 0.1710 | 0.2090 | 0.3458 | 0.2742 | 0.935 | 0.20 | 0.00 | 0.00 |
| 34 | La | 0 | 1 | 0.1058 | 0.1063 | 0.3930 | 0.3949 | 1.005 | 0.10 | 0.00 | 0.00 |
| 35 | La | 0 | 1 | 0.1798 | 0.1446 | 0.3040 | 0.3716 | 1.067 | 0.01 | 0.01 | 0.00 |
| 36 | La | 0 | 1 | 0.1448 | 0.1452 | 0.3959 | 0.3141 | 0.849 | 0.05 | 0.05 | 0.00 |
| 37 | La | 0.1 | 0.9 | 0.1168 | 0.1261 | 0.4090 | 0.3481 | 0.902 | 1.00 | 0.01 | 0.00 |
| 38 | La | 0 | 1 | 0.1206 | 0.1210 | 0.3790 | 0.3794 | 1.002 | 0.02 | 0.01 | 0.00 |
| 39 | La | 0 | 1 | 0.1279 | 0.1387 | 0.3596 | 0.3738 | 1.051 | 0.50 | 0.00 | 0.00 |
| 40 | La | 0 | 1 | 0.2166 | 0.1636 | 0.3039 | 0.3159 | 0.921 | 0.40 | 0.00 | 0.00 |
| 41 | La | 0.9 | 0.1 | 0.1404 | 0.1410 | 0.3592 | 0.3594 | 1.002 | 0.20 | 0.00 | 0.00 |
| 42 | La | 1 | 0 | 0.1705 | 0.2088 | 0.3162 | 0.3045 | 1.055 | 0.00 | 0.00 | 0.00 |
| 43 | La | 1 | 0 | 0.1071 | 0.1058 | 0.3506 | 0.4365 | 1.185 | 0.00 | 1.00 | 0.00 |
| 44 | La | 1 | 0 | 0.1127 | 0.1371 | 0.4123 | 0.3379 | 0.905 | 0.10 | 0.00 | 0.00 |
| 45 | La | 1 | 0 | 0.1510 | 0.1143 | 0.4185 | 0.3162 | 0.756 | 0.05 | 0.50 | 0.00 |
| 46 | La | 1 | 0 | 0.1329 | 0.1653 | 0.3120 | 0.3898 | 1.248 | 0.00 | 0.00 | 2.00 |
| 47 | La | 1 | 0 | 0.1899 | 0.1897 | 0.3102 | 0.3102 | 1.000 | 0.03 | 0.00 | 0.00 |
| 48 | La | 1 | 0 | 0.1301 | 0.1116 | 0.3981 | 0.3602 | 0.893 | 0.00 | 0.00 | 0.00 |
| *49 | Y | 0.05 | 0.95 | 0.0800 | 0.0800 | 0.4200 | 0.4200 | 1.000 | 0.00 | 0.00 | 0.00 |
| *50 | 0.8Yb—0.2Ce | 0.00 | 1.00 | 0.2000 | 0.2100 | 0.2900 | 0.3000 | 1.041 | 0.00 | 0.00 | 0.00 |
| *51 | Nd | 0.10 | 0.90 | 0.0660 | 0.0500 | 0.4850 | 0.3990 | 0.815 | 0.00 | 0.00 | 0.00 |
| *52 | 0.3Dy—0.7Gd | 0.50 | 0.50 | 0.2100 | 0.2000 | 0.2900 | 0.3000 | 1.000 | 0.00 | 0.00 | 0.00 |
| *53 | Ce | 0.85 | 0.15 | 0.0750 | 0.0555 | 0.4900 | 0.3795 | 0.770 | 0.00 | 0.00 | 0.00 |
| *54 | 0.6Pr—0.4Eu | 1.00 | 0.00 | 0.1130 | 0.1260 | 0.4000 | 0.3610 | 0.949 | 0.00 | 0.00 | 0.00 |
| *55 | 0.4Er—0.6La | 0.90 | 0.10 | 0.0675 | 0.0675 | 0.3850 | 0.4800 | 1.210 | 0.00 | 0.00 | 0.00 |
| *56 | 0.7Nd—0.3Y | 1.00 | 0.00 | 0.1600 | 0.0900 | 0.3720 | 0.3780 | 0.880 | 0.00 | 0.00 | 0.00 |

Sample numbers marked with * are out of the scope of the present invention.

TABLE 2

| Sample No. | Ta₂O₅ (wt. %) | MnO₂ + WO₃ + Nb₂O₅ + Ta₂O₅ (wt. %) | Thickness of grain boundary layer (nm) | Crystal comprising at least one selected from α-Al₂O₃, β-Al₂O₃ and θ-Al₂O₃. ** | Dielectric characteristics | | |
|---|---|---|---|---|---|---|---|
| | | | | | ε r | Q factor | τ f ppm/° C. |
| 1 | 0.00 | 0.01 | 7.6 | X | 45.7 | 47000 | 25.1 |
| 2 | 0.00 | 1.00 | 1.2 | X | 35.5 | 50000 | −25.6 |
| 3 | 0.00 | 0.04 | 0.0 | ○ | 31.9 | 52000 | 1.9 |
| 4 | 0.00 | 0.50 | 4.0 | X | 40.5 | 47000 | −15.7 |
| 5 | 0.00 | 0.30 | 0.8 | ○ | 38.8 | 51000 | −13.3 |
| 6 | 0.01 | 0.01 | 0.0 | ○ | 33.1 | 60000 | −25.3 |

TABLE 2-continued

| Sample No. | MnO$_2$ + WO$_3$ + Ta$_2$O$_5$ (wt. %) | Nb$_2$O$_5$ + Ta$_2$O$_5$ (wt. %) | Thickness of grain boundary layer (nm) | Crystal comprising at least one selected from α-Al$_2$O$_3$, β-Al$_2$O$_3$ and θ-Al$_2$O$_3$. ** | Dielectric characteristics ε r | Q factor | τ f ppm/° C. |
|---|---|---|---|---|---|---|---|
| 7 | 0.03 | 0.04 | 2.4 | X | 39.5 | 46000 | −0.5 |
| 8 | 0.00 | 0.05 | 3.6 | X | 43.8 | 48000 | 11.3 |
| 9 | 0.00 | 0.00 | 5.6 | ○ | 39.6 | 45000 | 27.6 |
| 10 | 0.00 | 0.01 | 3.2 | X | 38.1 | 46000 | 27.1 |
| 11 | 0.00 | 0.05 | 6.4 | X | 47.3 | 49000 | 27.7 |
| 12 | 0.00 | 0.08 | 0.4 | X | 48.0 | 51000 | 20.2 |
| 13 | 0.00 | 1.00 | 0.0 | ○ | 45.7 | 53000 | −4.3 |
| 14 | 0.00 | 1.20 | 10.4 | ○ | 39.4 | 43000 | 10.6 |
| 15 | 0.00 | 0.00 | 14.0 | X | 36.6 | 43000 | 15.7 |
| 16 | 0.00 | 0.51 | 4.8 | ○ | 36.1 | 47000 | −13.6 |
| 17 | 0.05 | 0.08 | 12.4 | X | 35.2 | 43000 | 18.3 |
| 18 | 1.50 | 1.58 | 0.0 | ○ | 43.1 | 55000 | 20.1 |
| 19 | 0.00 | 2.00 | 0.0 | ○ | 41.7 | 60000 | 1.0 |
| 20 | 0.50 | 0.55 | 0.0 | ○ | 40.1 | 57000 | 2.0 |
| 21 | 0.00 | 0.03 | 0.0 | ○ | 34.7 | 53000 | 2.6 |
| 22 | 0.20 | 0.29 | 4.0 | ○ | 43.8 | 48000 | 26.1 |
| 23 | 0.01 | 1.01 | 0.0 | ○ | 43.0 | 53000 | 3.8 |
| 24 | 0.00 | 1.32 | 5.2 | X | 39.8 | 45000 | 20.2 |
| 25 | 0.00 | 0.00 | 20.0 | ○ | 39.3 | 43000 | −2.4 |
| 26 | 0.00 | 0.12 | 2.4 | ○ | 32.6 | 49000 | 28.1 |
| 27 | 0.70 | 0.85 | 7.2 | ○ | 44.7 | 47000 | 1.0 |
| 28 | 0.00 | 0.01 | 4.4 | ○ | 44.6 | 48000 | −3.3 |
| 29 | 0.00 | 0.00 | 3.2 | ○ | 37.7 | 47000 | −10.3 |
| 30 | 0.00 | 0.05 | 4.8 | ○ | 39.1 | 49000 | 5.8 |
| 31 | 0.00 | 1.00 | 0.0 | ○ | 32.5 | 55000 | −25.5 |
| 32 | 0.00 | 0.50 | 0.0 | X | 38.8 | 59000 | 3.3 |
| 33 | 0.00 | 0.20 | 0.0 | X | 34.7 | 61000 | −20.5 |
| 34 | 0.00 | 0.10 | 0.4 | X | 46.4 | 51000 | 28.5 |
| 35 | 0.00 | 0.02 | 0.0 | X | 38.7 | 58000 | −3.0 |
| 36 | 0.00 | 0.10 | 3.2 | X | 33.9 | 46000 | −6.5 |
| 37 | 0.00 | 1.01 | 0.0 | X | 38.5 | 57000 | 21.3 |
| 38 | 0.00 | 0.03 | 0.0 | ○ | 45.7 | 59000 | 17.2 |
| 39 | 0.00 | 0.50 | 0.8 | ○ | 44.6 | 50000 | 12.3 |
| 40 | 0.00 | 0.40 | 6.8 | ○ | 36.8 | 49000 | −18.7 |
| 41 | 0.00 | 0.20 | 0.0 | X | 40.1 | 70000 | 2.1 |
| 42 | 0.00 | 0.00 | 16.8 | ○ | 31.7 | 43000 | −16.0 |
| 43 | 0.01 | 1.01 | 2.4 | X | 42.6 | 48000 | 28.5 |
| 44 | 2.90 | 3.00 | 2.0 | X | 35.7 | 50000 | 18.2 |
| 45 | 0.00 | 0.55 | 0.0 | X | 33.5 | 61000 | 4.0 |
| 46 | 0.00 | 2.00 | 1.2 | X | 32.7 | 51000 | 2.6 |
| 47 | 0.00 | 0.03 | 0.0 | ○ | 30.2 | 80000 | −23.9 |
| 48 | 0.00 | 0.00 | 12.0 | ○ | 32.7 | 43000 | 12.2 |
| *49 | 0.00 | 0.00 | 30.2 | X | 35.9 | 17000 | 33.9 |
| *50 | 0.00 | 0.00 | 40.7 | X | 40.1 | 10000 | −37.8 |
| *51 | 0.00 | 0.00 | 66.1 | X | 29.0 | 13000 | −32.5 |
| *52 | 0.00 | 0.00 | 130.9 | X | 37.0 | 13000 | −39.9 |
| *53 | 0.00 | 0.00 | 32.0 | X | 33.2 | 16000 | 42.4 |
| *54 | 0.00 | 0.00 | 30.5 | X | 31.3 | 13000 | −36.4 |
| *55 | 0.00 | 0.00 | 35.4 | X | 34.0 | 18000 | 39.0 |
| *56 | 0.00 | 0.00 | 34.8 | X | 38.4 | 12000 | 6.3 |

Sample numbers marked with * are out of the scope of the present invention.
** ○: Sample having crystal observed therein
X: Sample with no crystal observed therein Example 2

Water was added to a mixture of rare earth element alkoxide solution and aluminum alkoxide solution so as to hydrolyze the alkoxide, thereby to obtain a perovskite type synthesized material I consisting of oxides of the rare earth element and aluminum having a mean particle size of 1 μm or less. Meanwhile water was added to a mixture of calcium alkoxide solution and/or strontium alkoxide solution and titanium alkoxide solution so as to hydrolyze the alkoxide, thereby to obtain a perovskite type synthesized material II consisting of oxides of calcium and/or strontium and titanium having a mean particle size of 1 μm or less. The synthesized material I, the synthesized material II, manganese carbonate (MnCO$_3$), tungsten oxide (WO$_3$), niobium oxide (Nb$_2$O$_5$) and tantalum oxide (Ta$_2$O$_5$), which have a mean particle size of 1 μm or smaller, were weighed in the proportions shown in Table 1 and mixed in wet mixing process in a ball mill to obtain a slurry. After adding 5% by weight of a binder to the slurry, the slurry was graded by spray dry process. The graded powder was formed into a disk shape under a pressure of about 1 ton/cm$^2$ before being degreased. The degreased preform was fired at a temperature from 1550 to 1650° C. in air atmosphere for 5 to 10 hours.

The disk surface (principal plane) of the sintered material thus obtained was polished to make it flat, and was subjected to ultrasonic cleaning in acetone. After drying at 150° C. for one hour, the sample was measured by cylinder resonance method so as to determine the relative dielectric constant εr, Q factor and the temperature coefficient τ$_f$ of resonant frequency, at measuring frequencies of 3.5 to 4.5 GHz. The value of Q factor was converted to a value at 1GHz based on the relation of (Q factor)×(Measuring frequency f)=constant, that holds generally for dielectric materials used in the microwave region. The values of temperature factor $\tau_f$ of resonant frequency at temperatures from 25 to 85° C. were calculated by taking the resonant frequency at 25° C. as the reference.

Raman spectrum of the sintered material was measured with laser wavelength of 514.5 nm, triple monochrometer setting and sensitivity of 0.05(nA/FS)×100. It was found that half width of the peak observed in the range from 700 to 900 $cm^{-1}$ of laser Raman spectrum of the sample within the scope of the present invention was not larger than 120 $cm^{-1}$.

These results are summarized in Tables 3 and 4. The notation in Table 3, for example 0.1Y 0.9La for the proportion of rare earth elements, indicates that Y and La are included in proportions of 0.1:0.9 in molar ratio.

As will be apparent from Table 3 and 4, the samples Nos.57 to 104 that were prepared by the metal alkoxide method according to the present invention showed excellent dielectric characteristics of relative dielectric constant εr in a range from 30 to 48, Q factor not less than 43000 as converted to the value at 1 GHz, particularly Q factor as high as 46000 or over when εr is not less than 40, and $\tau_f$ within ±30 (ppm/° C.).

Figure 3:
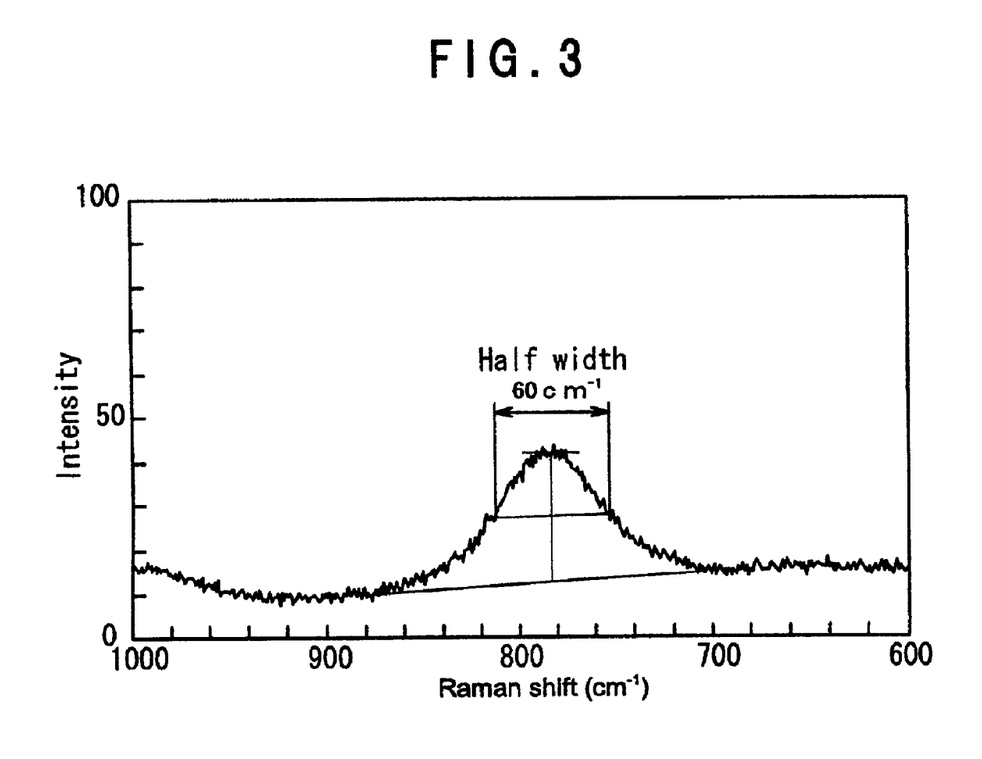
FIG. 3 shows the Raman spectrum of sample No.85 of Example of the present invention.
Figure 4:
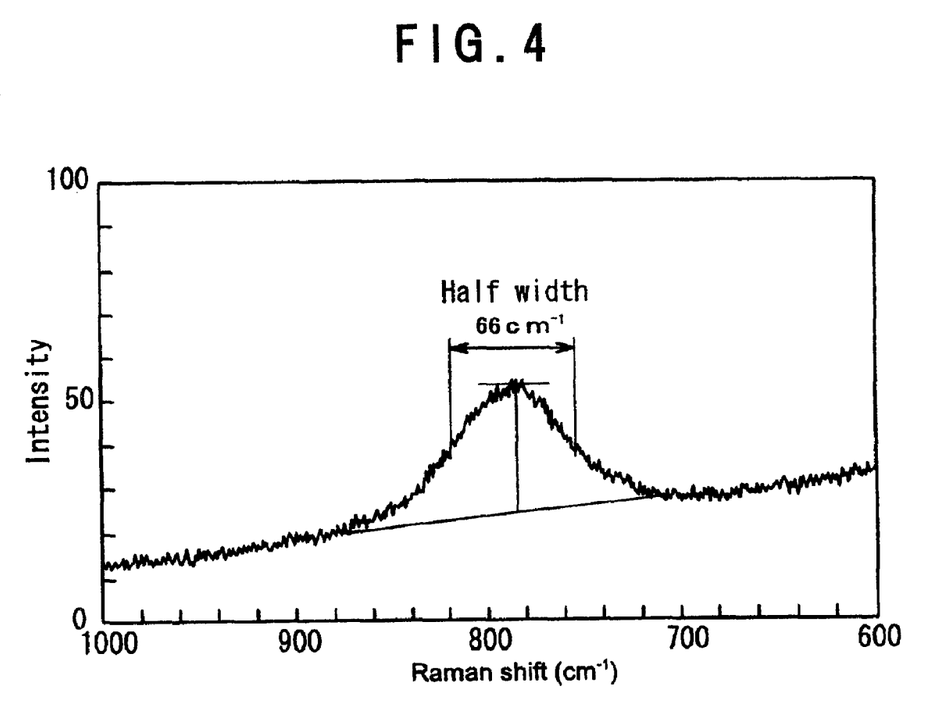
FIG. 4 shows the Raman spectrum of sample No.94 of Example of the present invention.

As an example of Raman spectrum of the dielectric porcelain of the present invention, Raman spectrum and half width of sample No.85 are shown in FIG. 3 and Raman spectrum and half width of sample No.94 are shown in FIG. 4.

Porcelains (samples Nos.105 to 112) which were made by calcining process described below and which is out of the scope of the present invention has a larger value than 120 $cm^{-1}$ in half width of the peak observed in the range from 700 to 900 $cm^{-1}$ of laser Raman spectrum, thereby to show a low value of εr, a low value of Q factor and/or absolute value of $\tau_f$ larger than 30.

Calcining process: Powders of oxide of a rare earth element, aluminum oxide ($Al_2O_3$), calcium carbonate ($CaCO_3$), strontium carbonate ($SrCO_3$) and titanium oxide ($TiO_2$) were weighed in the proportions of a, b, c and d in terms of molar ratio shown in Table 3 and mixed with pure water. The mixture was subjected to wet mixing process and crushed in a ball mill till the mean particle size was reduced to 2 μm or less. The mixture was dried and then fired at 1200° C. for 2 hours to obtain a calcined powder. This calcined powder was mixed with manganese carbonate ($MnCO_3$), tungsten oxide ($WO_3$), niobium oxide ($Nb_2O_5$) and tantalum oxide ($Ta_2O_5$) in proportions of weight percent shown in Table 3. With pure water being added, the mixture was subjected to wet crushing process in a ball mill.

After adding a binder to the slurry, the slurry was graded by spray dry process. The graded powder was formed into a disk shape under a pressure of about 1 ton/$cm^2$ before being degreased. The degreased preform was fired at a temperature from 1630 to 1680° C. in air atmosphere for 5 to 10 hours.

TABLE 3

| Sample No. | Proportion of rare earth element | Proportions of CaO and SrO CaO | Proportions of CaO and SrO SrO | $Ln_2O_X$ a | $Al_2O_3$ b | MO = CaO + SrO c | $TiO_2$ d | (b + d)/(a + c) | $MnO_2$ (wt. %) | $WO_3$ (wt. %) | $Nb_2O_5$ (wt. %) | $Ta_2O_5$ (wt. %) |
|---|---|---|---|---|---|---|---|---|---|---|---|---|
| 57 | 0.1Y—0.9La | 0.00 | 1.00 | 0.0750 | 0.0750 | 0.4450 | 0.4050 | 0.923 | 0.01 | 0.00 | 0.00 | 0.00 |
| 58 | 0.1Sm—0.9Nd | 0.50 | 0.50 | 0.1190 | 0.1250 | 0.3780 | 0.3780 | 1.012 | 0.00 | 0.00 | 0.00 | 0.00 |
| 59 | 0.5La—0.5Sm | 0.80 | 0.20 | 0.2090 | 0.2090 | 0.2910 | 0.2910 | 1.000 | 0.04 | 0.00 | 0.00 | 0.00 |
| 60 | Nd | 0.40 | 0.60 | 0.1200 | 0.1210 | 0.3350 | 0.4240 | 1.198 | 0.50 | 0.00 | 0.00 | 0.00 |
| 61 | 0.1La—0.9Nd | 0.90 | 0.10 | 0.1200 | 0.1200 | 0.4220 | 0.3380 | 0.845 | 0.30 | 0.00 | 0.00 | 0.00 |
| 62 | 0.5La—0.5Nd | 0.30 | 0.70 | 0.2040 | 0.2000 | 0.2910 | 0.3050 | 1.020 | 0.00 | 0.00 | 0.01 | 0.01 |
| 63 | 0.1Ce—0.9Sm | 0.50 | 0.50 | 0.1489 | 0.1611 | 0.3350 | 0.3550 | 1.067 | 0.00 | 0.00 | 0.02 | 0.03 |
| 64 | 0.1Ce—0.9Nd | 0.50 | 0.50 | 0.0510 | 0.0510 | 0.4630 | 0.4350 | 0.946 | 0.00 | 0.00 | 0.02 | 0.05 |
| 65 | 0.4Nd—0.6La | 0.10 | 0.90 | 0.0550 | 0.0560 | 0.5004 | 0.3886 | 0.801 | 0.00 | 0.00 | 0.00 | 0.00 |
| 66 | 0.1Pr—0.9Nd | 0.50 | 0.50 | 0.0891 | 0.0959 | 0.4650 | 0.3500 | 0.805 | 0.00 | 0.01 | 0.00 | 0.00 |
| 67 | 0.5Sm—0.5Nd | 0.70 | 0.30 | 0.0720 | 0.0720 | 0.4350 | 0.4210 | 0.972 | 0.00 | 0.05 | 0.00 | 0.00 |
| 68 | Sm | 0.20 | 0.80 | 0.0650 | 0.0510 | 0.4290 | 0.4550 | 1.024 | 0.00 | 0.00 | 0.00 | 0.00 |
| 69 | 0.1Sm—0.9Nd | 0.80 | 0.20 | 0.1270 | 0.1550 | 0.3320 | 0.3860 | 1.179 | 0.00 | 1.00 | 0.00 | 0.00 |
| 70 | 0.5Sm—0.5Nd | 0.50 | 0.50 | 0.1021 | 0.1040 | 0.3589 | 0.4350 | 1.169 | 0.00 | 1.20 | 0.00 | 0.00 |
| 71 | Eu | 0.50 | 0.50 | 0.0550 | 0.0550 | 0.5050 | 0.3850 | 0.786 | 0.00 | 0.00 | 0.00 | 0.00 |
| 72 | 0.1Eu—0.9Nd | 0.40 | 0.60 | 0.1360 | 0.1700 | 0.3400 | 0.3550 | 1.105 | 0.00 | 0.01 | 0.25 | 0.50 |
| 73 | Gd | 0.20 | 0.80 | 0.0550 | 0.0550 | 0.4155 | 0.4745 | 1.125 | 0.00 | 0.03 | 0.02 | 0.05 |
| 74 | 0.1Gd—0.9Nd | 0.80 | 0.20 | 0.0730 | 0.0730 | 0.4270 | 0.4270 | 1.000 | 0.00 | 0.08 | 0.75 | 1.50 |
| 75 | Dy | 0.50 | 0.50 | 0.1116 | 0.1116 | 0.4317 | 0.3451 | 0.841 | 0.00 | 1.00 | 0.00 | 1.00 |
| 76 | 0.1Dy—0.9Nd | 0.40 | 0.60 | 0.1048 | 0.1048 | 0.3952 | 0.3952 | 1.000 | 0.03 | 0.02 | 0.25 | 0.50 |
| 77 | 0.5Dy—0.5Nd | 1.00 | 0.00 | 0.0740 | 0.0740 | 0.4660 | 0.3880 | 0.852 | 0.03 | 0.00 | 0.00 | 0.00 |
| 78 | 0.1Sm—0.9La | 0.50 | 0.50 | 0.0831 | 0.0831 | 0.4169 | 0.4169 | 1.000 | 0.09 | 0.00 | 0.10 | 0.20 |
| 79 | 0.3Nd—0.7La | 0.40 | 0.60 | 0.1022 | 0.1022 | 0.4426 | 0.3530 | 0.836 | 1.00 | 0.00 | 0.01 | 0.01 |
| 80 | 0.1Gd—0.9Eu | 0.20 | 0.80 | 0.0834 | 0.0834 | 0.4150 | 0.4182 | 1.006 | 0.02 | 1.30 | 0.00 | 0.00 |
| 81 | 0.2Dy—0.8Eu | 0.50 | 0.50 | 0.1650 | 0.1710 | 0.3320 | 0.3320 | 1.012 | 0.00 | 0.00 | 0.00 | 0.00 |
| 82 | 0.9Nd—0.1La | 0.30 | 0.70 | 0.2080 | 0.2070 | 0.3490 | 0.2360 | 0.795 | 0.07 | 0.05 | 0.00 | 0.00 |
| 83 | La | 0.00 | 1.00 | 0.0950 | 0.0950 | 0.4050 | 0.4050 | 1.000 | 0.06 | 0.09 | 0.00 | 0.35 |
| 84 | 0.9Nd—0.1La | 0.50 | 0.50 | 0.1150 | 0.1170 | 0.3800 | 0.3880 | 1.020 | 0.01 | 0.00 | 0.00 | 0.00 |
| 85 | Nd | 1 | 0 | 0.1573 | 0.1573 | 0.3427 | 0.3427 | 1.000 | 0.00 | 0.00 | 0.00 | 0.00 |
| 86 | Nd | 1 | 0 | 0.1257 | 0.1547 | 0.3598 | 0.3598 | 1.060 | 0.00 | 0.00 | 0.00 | 0.00 |
| 87 | Nd | 1 | 0 | 0.2055 | 0.1638 | 0.3510 | 0.2797 | 0.797 | 1.00 | 0.00 | 0.00 | 0.00 |
| 88 | La | 0 | 1 | 0.1332 | 0.1388 | 0.3819 | 0.3461 | 0.941 | 0.50 | 0.00 | 0.00 | 0.00 |
| 89 | La | 0 | 1 | 0.1657 | 0.2036 | 0.3510 | 0.2797 | 0.935 | 0.20 | 0.00 | 0.00 | 0.00 |
| 90 | Nd | 1 | 0 | 0.1011 | 0.1011 | 0.3989 | 0.3989 | 1.000 | 0.10 | 0.00 | 0.00 | 0.00 |
| 91 | La | 0 | 1 | 0.1751 | 0.1394 | 0.3090 | 0.3765 | 1.066 | 0.01 | 0.01 | 0.00 | 0.00 |
| 92 | La | 0 | 1 | 0.1402 | 0.1402 | 0.4006 | 0.3190 | 0.849 | 0.05 | 0.05 | 0.00 | 0.00 |
| 93 | La | 0.1 | 0.9 | 0.1113 | 0.1209 | 0.4142 | 0.3536 | 0.903 | 0.00 | 0.01 | 0.00 | 0.00 |
| 94 | La | 0 | 1 | 0.1161 | 0.1161 | 0.3839 | 0.3839 | 1.000 | 0.02 | 0.01 | 0.00 | 0.00 |
| 95 | La | 0 | 1 | 0.1226 | 0.1333 | 0.3647 | 0.3794 | 1.052 | 0.50 | 0.00 | 0.00 | 0.00 |

TABLE 3-continued

| Sample No. | Proportion of rare earth element | Proportions of CaO and SrO | | $Ln_2O_X$ a | $Al_2O_3$ b | MO = CaO + SrO c | $TiO_2$ d | $\frac{(b+d)}{(a+c)}$ | $MnO_2$ (wt. %) | $WO_3$ (wt. %) | $Nb_2O_5$ (wt. %) | $Ta_2O_5$ (wt. %) |
|---|---|---|---|---|---|---|---|---|---|---|---|---|
| | | CaO | SrO | | | | | | | | | |
| 96 | La | 0 | 1 | 0.2112 | 0.1581 | 0.3081 | 0.3216 | 0.922 | 0.00 | 0.00 | 0.00 | 0.00 |
| 97 | La | 0.9 | 0.1 | 0.1360 | 0.1360 | 0.3640 | 0.3640 | 1.000 | 0.20 | 0.00 | 0.00 | 0.00 |
| 98 | La | 1 | 0 | 0.1657 | 0.2036 | 0.3216 | 0.3091 | 1.052 | 0.00 | 0.00 | 0.00 | 0.00 |
| 99 | La | 1 | 0 | 0.1021 | 0.1000 | 0.3556 | 0.4423 | 1.185 | 0.00 | 1.00 | 0.01 | 0.01 |
| 100 | La | 1 | 0 | 0.1075 | 0.1325 | 0.4175 | 0.3425 | 0.905 | 0.10 | 0.00 | 0.72 | 1.45 |
| 101 | La | 1 | 0 | 0.1465 | 0.1093 | 0.4235 | 0.3207 | 0.754 | 0.05 | 0.50 | 0.00 | 0.00 |
| 102 | La | 1 | 0 | 0.1279 | 0.1608 | 0.3171 | 0.3942 | 1.247 | 0.00 | 0.00 | 0.50 | 1.00 |
| 103 | La | 1 | 0 | 0.1847 | 0.1847 | 0.3153 | 0.3153 | 1.000 | 0.03 | 0.00 | 0.00 | 0.00 |
| 104 | La | 1 | 0 | 0.1258 | 0.1064 | 0.4029 | 0.3649 | 0.891 | 0.00 | 0.00 | 0.00 | 0.00 |
| *105 | Y | 0.01 | 0.99 | 0.0750 | 0.0750 | 0.4250 | 0.4250 | 1.000 | 0.00 | 0.00 | 0.00 | 0.00 |
| *106 | 0.9Yb—0.1Ce | 1.00 | 0.00 | 0.1960 | 0.2050 | 0.2950 | 0.3050 | 1.041 | 0.00 | 0.00 | 0.00 | 0.00 |
| *107 | Nd | 1.00 | 0.00 | 0.0810 | 0.0450 | 0.4900 | 0.4040 | 0.815 | 0.00 | 0.00 | 0.00 | 0.00 |
| *108 | 0.1Dy—0.9Gd | 0.40 | 0.60 | 0.2050 | 0.1950 | 0.2950 | 0.3050 | 1.000 | 0.00 | 0.00 | 0.00 | 0.00 |
| *109 | Ce | 0.00 | 1.00 | 0.0700 | 0.0505 | 0.4950 | 0.3845 | 0.770 | 0.00 | 0.00 | 0.00 | 0.00 |
| *110 | 0.6Pr—0.4Eu | 1.00 | 0.00 | 0.1080 | 0.1210 | 0.4050 | 0.3660 | 0.949 | 0.00 | 0.00 | 0.00 | 0.00 |
| *111 | 0.4Er—0.6La | 1.00 | 0.10 | 0.0625 | 0.0625 | 0.3900 | 0.4850 | 1.210 | 0.00 | 0.00 | 0.00 | 0.00 |
| *112 | 0.6Nd—0.4Y | 1.00 | 0.00 | 0.1550 | 0.0850 | 0.3770 | 0.3830 | 0.880 | 0.00 | 0.00 | 0.00 | 0.00 |

Sample numbers marked with * are out of the scope of the present invention.

TABLE 4

| Sample No. | $MnO_2 + WO_3 + Nb_2O_5 + Ta_2O_5$ (wt. %) | Synthesis method | Half width $(cm^{-1})$ | Dielectric characteristics | | |
|---|---|---|---|---|---|---|
| | | | | $\varepsilon r$ | Q factor | $\tau f$ ppm/° C. |
| 57 | 0.01 | Metal alkoxide method | 76 | 46.3 | 48000 | 26.9 |
| 58 | 0.00 | Metal alkoxide method | 73 | 36.9 | 51000 | -27.9 |
| 59 | 0.04 | Metal alkoxide method | 70 | 32.5 | 54000 | 1.9 |
| 60 | 0.50 | Metal alkoxide method | 77 | 40.2 | 46000 | -17.1 |
| 61 | 0.30 | Metal alkoxide method | 69 | 40.3 | 51000 | -14.6 |
| 62 | 0.02 | Metal alkoxide method | 55 | 33.5 | 62000 | -27.4 |
| 63 | 0.05 | Metal alkoxide method | 79 | 41.0 | 46000 | -0.7 |
| 64 | 0.07 | Metal alkoxide method | 77 | 44.5 | 48000 | 12.1 |
| 65 | 0.00 | Metal alkoxide method | 99 | 39.3 | 43000 | 29.7 |
| 66 | 0.01 | Metal alkoxide method | 77 | 39.6 | 46000 | 29.1 |
| 67 | 0.05 | Metal alkoxide method | 71 | 47.9 | 49000 | 29.8 |
| 68 | 0.00 | Metal alkoxide method | 66 | 48.0 | 52000 | 21.7 |
| 69 | 1.00 | Metal alkoxide method | 68 | 46.5 | 54000 | -4.8 |
| 70 | 1.20 | Metal alkoxide method | 82 | 39.1 | 45000 | 11.3 |
| 71 | 0.00 | Metal alkoxide method | 87 | 38.1 | 43000 | 16.8 |
| 72 | 0.76 | Metal alkoxide method | 76 | 36.6 | 47000 | -14.9 |
| 73 | 0.10 | Metal alkoxide method | 78 | 36.6 | 45000 | 19.6 |
| 74 | 2.33 | Metal alkoxide method | 61 | 43.8 | 56000 | 21.6 |
| 75 | 2.00 | Metal alkoxide method | 60 | 41.4 | 61000 | 1.0 |
| 76 | 0.80 | Metal alkoxide method | 65 | 41.6 | 57000 | 2.0 |
| 77 | 0.03 | Metal alkoxide method | 68 | 35.0 | 55000 | 2.6 |
| 78 | 0.39 | Metal alkoxide method | 74 | 45.2 | 48000 | 28.1 |
| 79 | 1.02 | Metal alkoxide method | 65 | 43.6 | 54000 | 4.0 |
| 80 | 1.32 | Metal alkoxide method | 77 | 39.4 | 45000 | 21.7 |
| 81 | 0.00 | Metal alkoxide method | 93 | 39.6 | 43000 | -2.7 |
| 82 | 0.12 | Metal alkoxide method | 75 | 32.9 | 49000 | 29.0 |
| 83 | 0.50 | Metal alkoxide method | 78 | 46.1 | 48000 | 1.0 |
| 84 | 0.01 | Metal alkoxide method | 74 | 45.2 | 48000 | -3.8 |
| 85 | 0.00 | Metal alkoxide method | 60 | 46.0 | 48000 | -3.7 |
| 86 | 0.00 | Metal alkoxide method | 70 | 40.3 | 49000 | 8.0 |
| 87 | 1.00 | Metal alkoxide method | 65 | 33.6 | 56000 | -25.0 |
| 88 | 0.50 | Metal alkoxide method | 60 | 38.2 | 62000 | 3.5 |
| 89 | 0.20 | Metal alkoxide method | 59 | 34.0 | 64000 | -22.3 |
| 90 | 0.10 | Metal alkoxide method | 70 | 46.2 | 51000 | 28.3 |
| 91 | 0.02 | Metal alkoxide method | 58 | 40.5 | 60000 | -3.3 |
| 92 | 0.10 | Metal alkoxide method | 75 | 34.1 | 46000 | -7.2 |
| 93 | 0.01 | Metal alkoxide method | 62 | 39.8 | 59000 | 22.8 |
| 94 | 0.03 | Metal alkoxide method | 66 | 46.3 | 60000 | 18.5 |
| 95 | 0.50 | Metal alkoxide method | 74 | 44.6 | 51000 | 13.1 |
| 96 | 0.00 | Metal alkoxide method | 71 | 38.6 | 50000 | -20.3 |
| 97 | 0.20 | Metal alkoxide method | 49 | 40.4 | 71000 | 2.1 |
| 98 | 0.00 | Metal alkoxide method | 81 | 32.9 | 43000 | -17.5 |
| 99 | 1.02 | Metal alkoxide method | 78 | 43.4 | 47000 | 28.8 |
| 100 | 2.27 | Metal alkoxide method | 73 | 35.5 | 51000 | 19.5 |
| 101 | 0.55 | Metal alkoxide method | 62 | 35.0 | 61000 | 4.2 |
| 102 | 1.50 | Metal alkoxide method | 68 | 32.7 | 52000 | 2.6 |

TABLE 4-continued

| Sample No. | MnO$_2$ + WO$_3$ + Nb$_2$O$_5$ + Ta$_2$O$_5$ (wt. %) | Synthesis method | Half width (cm$^{-1}$) | Dielectric characteristics | | |
|---|---|---|---|---|---|---|
| | | | | ϵr | Q factor | τf ppm/° C. |
| 103 | 0.03 | Metal alkoxide method | 41 | 33.2 | 83000 | −26.0 |
| 104 | 0.00 | Metal alkoxide method | 81 | 33.4 | 43000 | 13.0 |
| *105 | 0.00 | Calcining method | 130 | 36.0 | 17000 | 36.5 |
| *106 | 0.00 | Calcining method | Impossible to measure | 42.4 | 8000 | −41.0 |
| *107 | 0.00 | Calcining method | Impossible to measure | 29.7 | 10000 | −35.3 |
| *108 | 0.00 | Calcining method | 130 | 36.9 | 15000 | −43.3 |
| *109 | 0.00 | Calcining method | 140 | 33.0 | 13000 | 45.7 |
| *110 | 0.00 | Calcining method | 150 | 31.0 | 15000 | −39.5 |
| *111 | 0.00 | Calcining method | 160 | 33.5 | 16000 | 42.0 |
| *112 | 0.00 | Calcining method | Impossible to measure | 38.5 | 12000 | 6.6 |

Sample numbers marked with * are out of the scope of the present invention.

Example 3

Water was added to a mixture of zirconium alkoxide solution, titanium alkoxide solution and tin alkoxide solution so as to hydrolyze the alkoxide, thereby to obtain a synthesized material III consisting of oxides of zirconium, titanium and tin having a mean particle size of 0.5 μm or less. The synthesized material III was made in such a composition as molar ratio of TiO$_2$ was in a range from 0.30 to 0.60, molar ratio of ZrO$_2$ was in a range from 0.25 to 0.60 and molar ratio of SnO$_2$ was in a range from 0.025 to 0.20.

After adding 3 to 10% by weight of a binder, the synthesized material III was dehydrated and was granulated by spray dry process. The granulated powder was formed into a shape by pressure molding process and fired at a temperature from 1300 to 1600° C. for 5 to 10 hours, thereby to obtain the dielectric porcelain of the present invention.

It was found that half width of the peak observed in the range from 700 to 900 cm$^{-1}$ of laser Raman spectrum of the dielectric material of the present invention was not larger than 120 cm$^{-1}$, showing good dielectric characteristics, such as Q factor not less than 43000 for the relative dielectric constant ϵr in a range from 30 to 48, particularly Q factor as high as 46000 or over when ϵr is not less than 40.

Meanwhile porcelains were made by calcining process described below as Comparative Example.

Powders of titanium oxide (TiO$_2$), zirconium oxide (ZrO$_2$) and tin oxide (SnO$_2$) were weighed in molar ratio of 0.30 to 0.60 for TiO$_2$, 0.25 to 0.60 for ZrO$_2$ and 0.025 to 0.20 for SnO$_2$, and were mixed with pure water added thereto. The mixture was subjected to wet mixing process and crushing in a ball mill till the mean particle size was reduced to 2 μm or less. The mixture was dried and then fired at 1100° C. for one hour to obtain a calcined powder. This calcined powder was mixed with pure water added thereto, and subjected to wet crushing process in a ball mill. After adding a binder to the slurry, the slurry was graded by spray dry process. The graded powder was formed into a disk shape under a pressure of about 1 ton/cm$^2$ before being degreased. The degreased preform was fired at a temperature from 1300 to 1600° C. in air atmosphere for 5 to 10 hours.

The dielectric material of this Comparative Example showed that the peak observed in the range from 700 to 900 cm$^{-1}$ of laser Raman spectrum was larger than 120 cm$^{-1}$, Q factor was less than 40000 in a range of relative dielectric constant ϵr from 30 to 48, and/or absolute value of τ$_f$ was higher than 30.

What is claimed is:

1. A dielectric porcelain comprising a polycrystalline material of which a main component comprises oxides containing at least a rare earth element (Ln), Al, M (M represents at least one selected from Ca and Sr) and Ti as metal elements, wherein the thickness of a grain boundary layer is 20 nm or less.

2. The dielectric porcelain according to claim 1, wherein at least a part of the oxide of Al is included in the form of crystal comprising at least one selected from α-Al$_2$O$_3$, β-Al$_2$O$_3$ and θ-Al$_2$O$_3$.

3. The dielectric porcelain according to claim 1, wherein the main component comprises oxides containing at least a rare earth element (Ln), Al, M (M represents at least one selected from Ca and Sr) and Ti as metal elements, and in case that a compositional formula of the oxides is represented by aLn$_2$O$_x$·bAl$_2$O$_3$·cMO·dTiO$_2$ (3≦x≦4), molar ratios a, b, c and d satisfy the following relationships:

$$0.056 \leq a \leq 0.214;$$

$$0.056 \leq b \leq 0.214;$$

$$0.286 \leq c \leq 0.500;$$

$$0.230 < d < 0.470;$$

and $$a+b+c+d=1.$$

4. The dielectric porcelain according to claim 1, wherein at least one of metal elements Mn, W, Nb and Ta is contained in the total amount of 0.01 to 3% by weight on the basis of MnO$_2$, WO$_3$, Nb$_2$O$_5$ and Ta$_2$O$_5$.

5. The dielectric porcelain according to claim 1, wherein the main component comprises oxides containing at least a rare earth element (Ln), Al, M (M represents at least one selected from Ca and Sr) and Ti as metal elements, and a half width of a peak observed in a range from 700 to 900 cm$^{-1}$ of laser Raman spectrum is 120 cm$^{-1}$ or less.

6. The dielectric porcelain according to claim 1, wherein the main component comprises oxides containing at least a rare earth element (Ln), Al, M (M represents at least one selected from Ca and Sr) and Ti as metal elements; a half width of a peak observed in a range from 700 to 900 cm$^{-1}$ of laser Raman spectrum is 120 cm$^{-1}$ or less; and at least one of metal elements Mn, W, Nb and Ta is contained in the total amount of 0.01 to 3% by weight on the basis of MnO$_2$, WO$_3$, Nb$_2$O$_5$ and Ta$_2$O$_5$.

7. A dielectric porcelain comprising oxides, as a main component, containing at least Ti, Zr and Sn as metal elements, wherein a half width of a peak observed in a range from 700 to 900 cm$^{-1}$ of laser Raman spectrum is 120 cm$^{-1}$ or less.

8. The dielectric porcelain according to claim 7, wherein the main component comprises oxides containing at least Ti, Zr and Sn as metal elements, and in case that a compositional formula of the oxides is represented by hTiO$_2$.iZrO$_2$.jSnO$_2$, molar ratios h, i and j satisfy the following relationships:

$0.30 \leq h \leq 0.60$;

$0.25 \leq i \leq 0.60$;

$0.025 \leq j \leq 0.20$;

and $h+i+j=1$.

9. A dielectric resonator comprising the dielectric porcelain of any one of claims 1 to 8 disposed between a pair of input and output terminals, so as to function through electromagnetic coupling.

* * * * *